(12) United States Patent
Keesling et al.

(10) Patent No.: US 11,930,156 B2
(45) Date of Patent: Mar. 12, 2024

(54) METHODS AND ASSOCIATED DEVICES AND SYSTEMS FOR ENHANCED 2D AND 3D VISION

(71) Applicant: Applied Minds, LLC, Burbank, CA (US)

(72) Inventors: Michael Keesling, Agoura Hills, CA (US); Clinton Blake Hope, Los Angeles, CA (US); Kevin Robert Keegan, Burbank, CA (US); Kjerstin Irja Williams, Burbank, CA (US); Bran Ferren, Beverly Hills, CA (US); David Foor, Altadena, CA (US)

(73) Assignee: Applied Minds, LLC, Burbank, CA (US)

( * ) Notice: Subject to any disclaimer, the term of this patent is extended or adjusted under 35 U.S.C. 154(b) by 37 days.

(21) Appl. No.: 17/805,963

(22) Filed: Jun. 8, 2022

(65) Prior Publication Data

US 2022/0321865 A1 Oct. 6, 2022

Related U.S. Application Data

(63) Continuation of application No. 17/068,562, filed on Oct. 12, 2020, now Pat. No. 11,363,251, which is a
(Continued)

(51) Int. Cl.
*H04N 13/00* (2018.01)
*G02B 23/12* (2006.01)
(Continued)

(52) U.S. Cl.
CPC ........... *H04N 13/344* (2018.05); *G02B 23/12* (2013.01); *G02B 27/017* (2013.01);
(Continued)

(58) Field of Classification Search
CPC .. H04N 13/344; H04N 13/194; H04N 13/239; H04N 13/246; H04N 13/302;
(Continued)

(56) References Cited

U.S. PATENT DOCUMENTS

| 6,597,807 B1 | 7/2003 | Watkins et al. |
| 7,057,647 B1 | 6/2006 | Monroe |

(Continued)

OTHER PUBLICATIONS

Buades, Antonio, et al., "A non-local algorithm for image denoising", Proc. IEEE CVPR, vol. 2, Jun. 2005, 60-65.
(Continued)

*Primary Examiner* — Alazar Tilahun
(74) *Attorney, Agent, or Firm* — Perkins Coie LLP; Michael A. Glenn

(57) ABSTRACT

Methods, devices and systems are disclosed for improved depth perception in stereoscopic night vision devices. Among these are embodiments for aligning information overlays in the stereo view with associated objects, and for generating stereo information from single lenses or intensifiers. In some illustrative embodiments, a camera and position sensor are provided for at least two viewers, e.g., a pilot and a copilot, such that when a scene overlaps between viewers, the system produces a stereoptic scene, in which the users can more accurately determine a difference in depth between two or more distant objects. An illustrative binocular night vision system uses a high-resolution depth map to present binocular images to a user. In some embodiments, supplementary content can be overlaid, with an appropriate binocular disparity that is based on the depth map.

15 Claims, 20 Drawing Sheets

Related U.S. Application Data continuation of application No. 15/663,617, filed on Jul. 28, 2017, now Pat. No. 10,805,600.

(60) Provisional application No. 62/368,846, filed on Jul. 29, 2016.

(51) Int. Cl.
| | | |
|---|---|---|
| *G02B 27/01* | (2006.01) | |
| *H04N 13/194* | (2018.01) | |
| *H04N 13/239* | (2018.01) | |
| *H04N 13/246* | (2018.01) | |
| *H04N 13/344* | (2018.01) | |
| *G02B 23/18* | (2006.01) | |
| *H04N 13/302* | (2018.01) | |

(52) U.S. Cl.
CPC ......... *H04N 13/194* (2018.05); *H04N 13/239* (2018.05); *H04N 13/246* (2018.05); *G02B 23/18* (2013.01); *G02B 2027/0138* (2013.01); *H04N 13/302* (2018.05)

(58) Field of Classification Search
CPC .... H04N 13/156; H04N 13/25; H04N 13/398; H04N 13/356; H04N 13/296; H04N 13/122; G02B 23/12; G02B 27/017; G02B 23/18; G02B 2027/0138
See application file for complete search history.

(56) References Cited

U.S. PATENT DOCUMENTS

| | | |
|---|---|---|
| 8,836,793 B1 | 9/2014 | Kriesel et al. |
| 9,204,041 B1 | 12/2015 | Campbell |
| 2002/0175268 A1 | 11/2002 | Smith |
| 2003/0147002 A1 | 8/2003 | Ray et al. |
| 2004/0036013 A1 | 2/2004 | Bacarella et al. |
| 2006/0081770 A1 | 4/2006 | Buchin et al. |
| 2006/0187326 A1 | 8/2006 | Spencer et al. |
| 2008/0157000 A1 | 7/2008 | Shamir et al. |
| 2008/0237771 A1 | 10/2008 | Pilla et al. |
| 2010/0243890 A1 | 9/2010 | Hall |
| 2011/0042550 A1 | 2/2011 | Halahmi et al. |
| 2011/0069175 A1 | 3/2011 | Mistretta et al. |
| 2012/0212619 A1 | 8/2012 | Nagamune et al. |
| 2012/0314034 A1 | 12/2012 | Ott et al. |
| 2013/0063572 A1 | 3/2013 | Ramachandra et al. |
| 2013/0128003 A1 | 5/2013 | Kishida et al. |
| 2013/0141611 A1 | 6/2013 | Hirai et al. |
| 2016/0381345 A1* | 12/2016 | Wu ................... H04N 13/246 348/36 |
| 2017/0010850 A1* | 1/2017 | Kobayashi ......... G02B 27/0172 |
| 2017/0251193 A1* | 8/2017 | Zhou ..................... G06T 7/593 |

OTHER PUBLICATIONS

Wang, Jin , et al., "Fast Non-Local Algorithm for Image Denoising", Image Processing, IEEE, International Conference Oct. 2006, Atlanta, GA, 1429-1432.

* cited by examiner

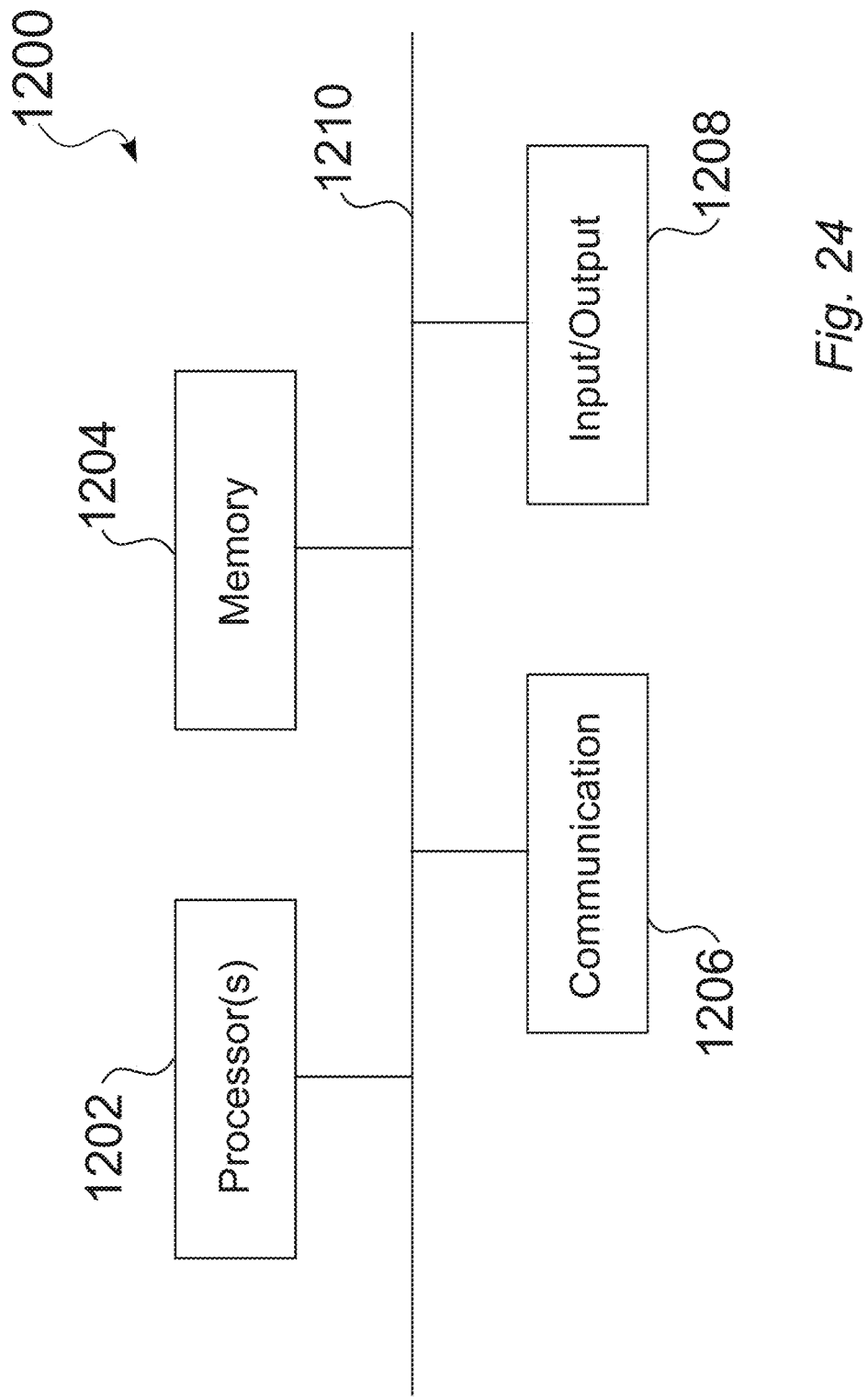

METHODS AND ASSOCIATED DEVICES AND SYSTEMS FOR ENHANCED 2D AND 3D VISION

CROSS REFERENCE TO RELATED APPLICATIONS

This Application is a Continuation of U.S. application Ser. No. 17/068,562, filed 12 Oct. 2020, which issued as U.S. Pat. No. 11,363,251 on 14 Jun. 2022, which is a continuation of U.S. application Ser. No. 15/663,617, filed 28 Jul. 2017, which issued as U.S. Pat. No. 10,805,600 on 13 Oct. 2020, which claims priority to U.S. Provisional Application No. 62/368,846, which was filed on 29 Jul. 2016, wherein each is incorporated herein in its entirety by this reference thereto.

FIELD OF THE INVENTION

At least one embodiment of the present invention pertains to methods and associated devices and systems for enhancing cameras and imagers. Some specific embodiments of the present invention pertains to methods and associated devices and systems for enhancing depth information in night vision cameras and imagers.

BACKGROUND

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. It is contemplated that many conventional night vision systems may typically generate stereo images (albeit monochromatic), wherein these conventional systems may often produce artifacts that interfere with effective depth perception. In some other conventional imaging and/or display systems, additional image information may typically be displayed in association with viewed objects wherein the additional image information may appear to "jump" forward to a depth of an occluding object, while a viewer may still view that the associated viewed object remained at an original depth behind the occluding object. By way of educational background, another aspect of the prior art generally useful to be aware of is that conventional prior art methods and systems may be mechanically complex, power-consuming intensive, and/or heavy.

SUMMARY OF THE INVENTION

Disclosed are systems, methods and devices for improved depth perception in stereoscopic night vision devices. Among these are techniques for aligning information overlays in the stereo view with associated objects and generating stereo information from single lenses and/or intensifiers.

BRIEF DESCRIPTION OF THE DRAWINGS

One or more embodiments of the present invention are illustrated by way of example and not limitation in the figures of the accompanying drawings, in which like references indicate similar elements.

FIG. 24 is a schematic view of an illustrative apparatus for producing a stereo color image from a single color channel.

DETAILED DESCRIPTION

Figure 1:
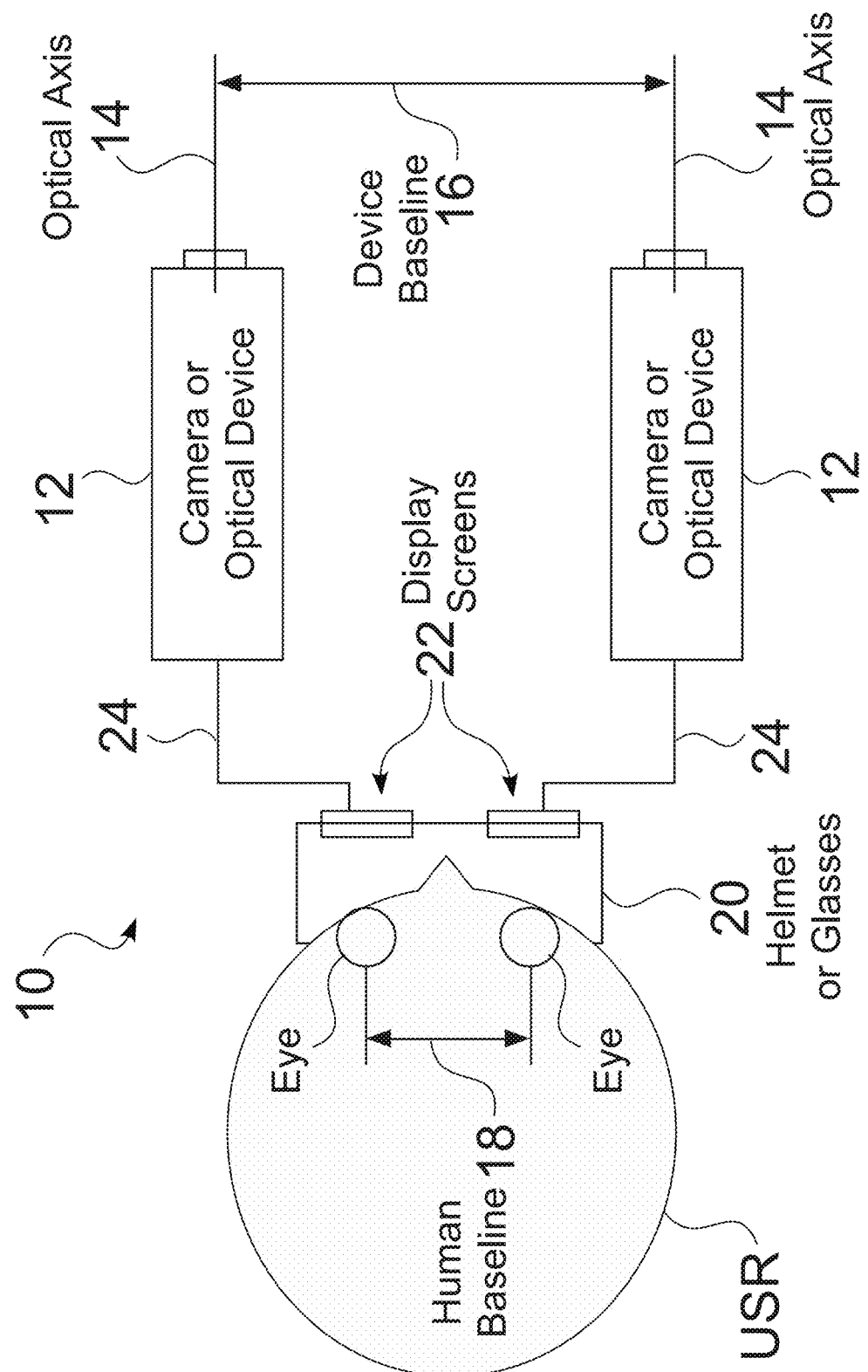
FIG. 1 is a partial schematic view of an illustrative stereoptic vision system having separate inputs from cameras or optical devices.

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

In some exemplary embodiments of night vision systems, two imagers, one in front of each eye, may be utilized to produce stereo images. In some other exemplary embodiments, binocular night vision (NV) systems may incorporate two image intensifier tubes, wherein an optical axis of each image intensifier tube may be aligned with one of the user's eyes. It is believed that aligning the optical axes of the image intensifier tubes with the user's eyes optimally provides that the binocular disparity of the imagery presented by the image intensifier tubes matches that of imagery (that would otherwise be) acquired by the eyes directly. The user is thus readily able to fuse the two presented images into a single Cyclopean image.

Furthermore, in many embodiments, augmented reality content such as, and without limitation, informational overlays, may provide additional visual data to a viewer via display by NV systems. For example, and without limitation, informational overlays that directly correspond to physical objects at particular physical distances, (e.g., labels annotating identified and tracked objects of interest within the field of view) should sensibly be presented with a binocular disparity corresponding to the physical distances. Such content may be presented to a user in one eye or in both eyes.

In another non-limiting example, informational overlays, (i.e., labels, symbols and/or other graphics corresponding to objects at particular location within the field of view) can be generated in each eye with a binocular disparity based on a value of a depth map at that particular location. It is believed that generating the overlay with a disparity matching the depth of the corresponding object greatly aids the user's sense of depth within the scene. The imagery acquired by image intensifiers corresponds to real world subject matter. As the user develops a mental model of his or her surroundings that corresponds to the physical world, realizing the benefits of binocular vision will lead to the contemplation of subject matter being presented across the two eyes with a disparity matching that of the physical world.

Introduced here are methods, systems and devices that improve depth perception in stereoscopic night vision devices. Among these are embodiments for aligning information overlays in the stereo view with associated objects, and for generating stereo information from single lenses or intensifiers.

In certain embodiments, a camera and position sensor are provided for at least two viewers, e.g., a pilot and a copilot, such that when a scene overlaps between viewers, the system produces a stereoptic scene, in which the users can more accurately determine a difference in depth between two or more distant objects.

In some embodiments, an illustrative binocular night vision system uses a high-resolution depth map to present binocular images to a user.

In some embodiments, supplementary content can be overlaid, with an appropriate binocular disparity that is based on the depth map. For example, supplementary information can be overlaid onto a phosphor screen integrated with night vision goggles (NVG), such as with a beam-splitter or with a low-powered infrared laser.

Some embodiments can generate stereo information from a single lens, e.g., using filters or sensors, which can be used for operation of remote controlled vehicles in underground/low light environments.

Other illustrative embodiments are configured to produce a stereo color image from a single color channel. Embodiments for automated focusing of NVGs are also disclosed, which can be based on user movement or action. Additionally, the lenses of an NVG can be set to converge in steps, to simulate distance.

Improved Depth Perception

Stereoscopy is a technique for creating or enhancing the illusion of depth in an image by means of stereopsis for binocular vision. Generally, these methods present two offset images separately to the left and right eye of the viewer. These two-dimensional images are then combined in the brain to give the perception of depth.

Stereoscopy is used to create 3D theatrical movies, but the same technique is also used in night vision goggles, thermal vision goggles, and other head mounted display devices. In these systems, the user typically wears a helmet or glasses with two small displays, one for each eye. The images shown on these displays are captured by two separate cameras or optical devices. These systems are often used by helicopter pilots flying in low light conditions.

The distance between the two cameras is generally called the baseline. For general purpose stereo photography, where the goal is to duplicate natural human vision and give a visual impression as close as possible to reality, the correct baseline would be the same as the distance between the eyes, which is generally around 65 mm.

If a stereo picture is taken of a large, distant object such as a mountain or a large building using a normal baseline, it will appear to be flat or lacking in depth. This is in keeping with normal human vision. To provide great depth detail in distant objects, the camera positions can be separated by a larger distance. This will effectively render the captured image as though it was seen by a giant, and thus will enhance the depth perception of these distant objects, and reduce the apparent scale of the scene proportionately.

Figure 2:
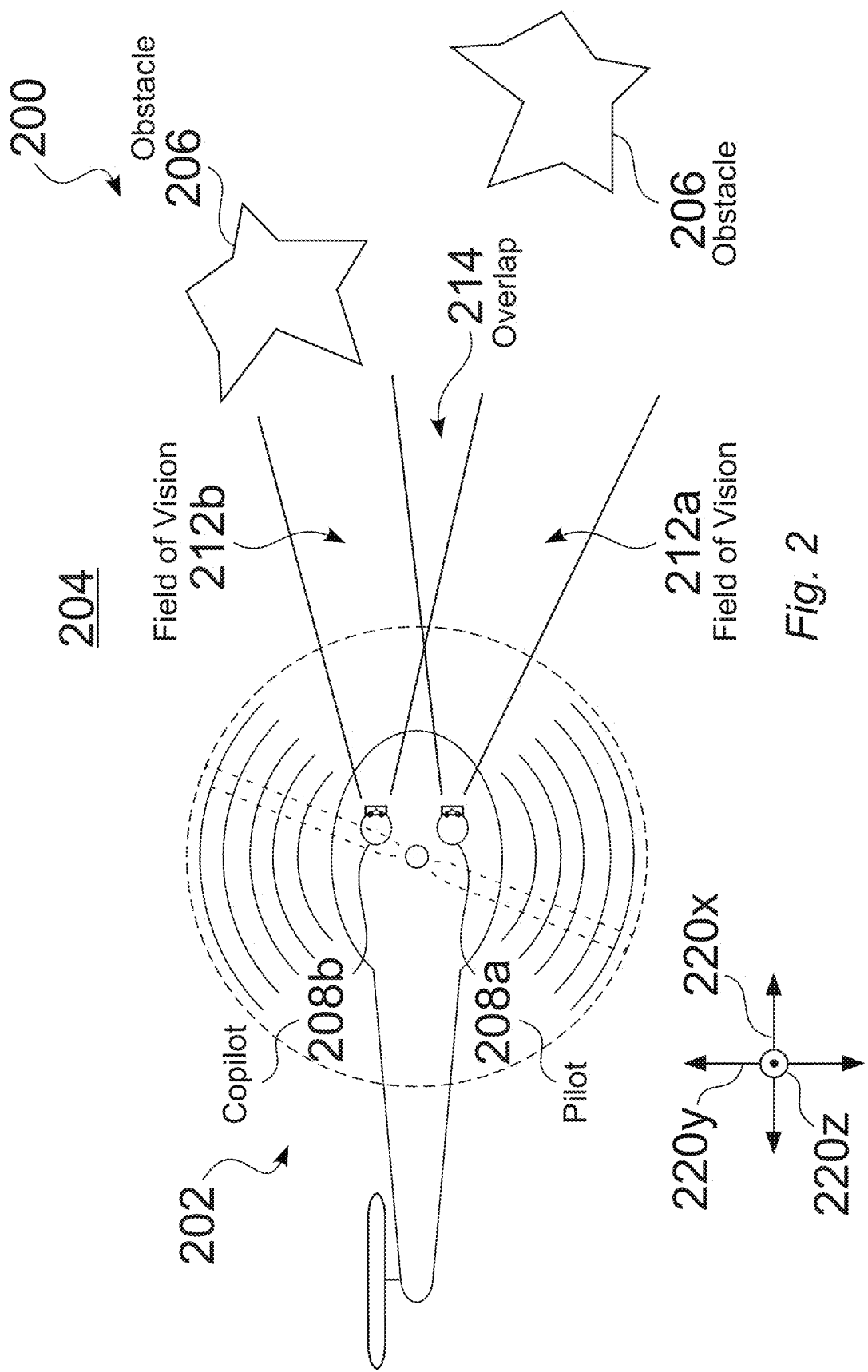
FIG. 2 is a schematic view of an operating environment in which an illustrative stereoptic vision system can be used.
Figure 3:
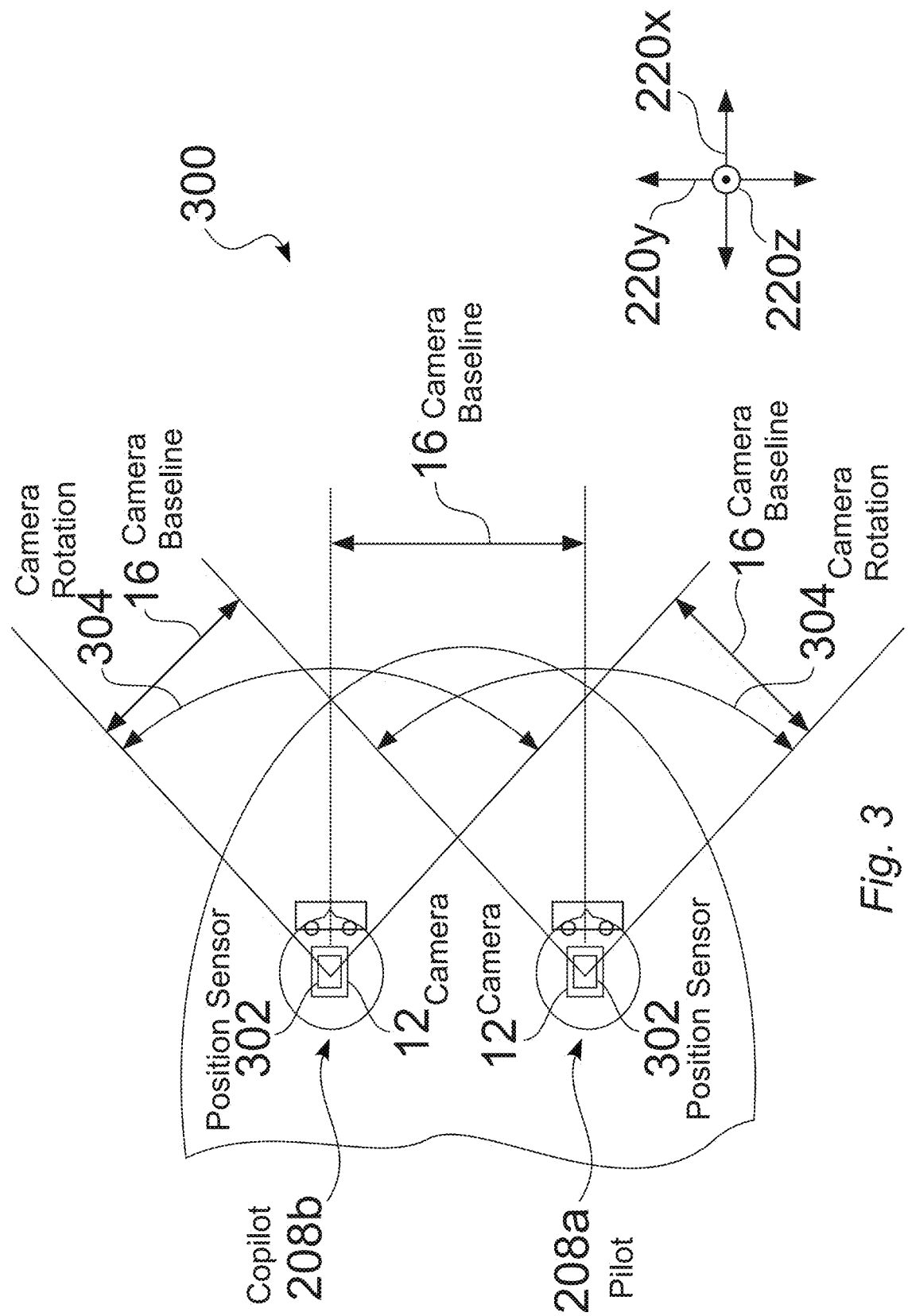
FIG. 3 is schematic view of camera baselines as a function of camera rotation for different viewers USR, e.g., a pilot and a copilot.
Figure 4:
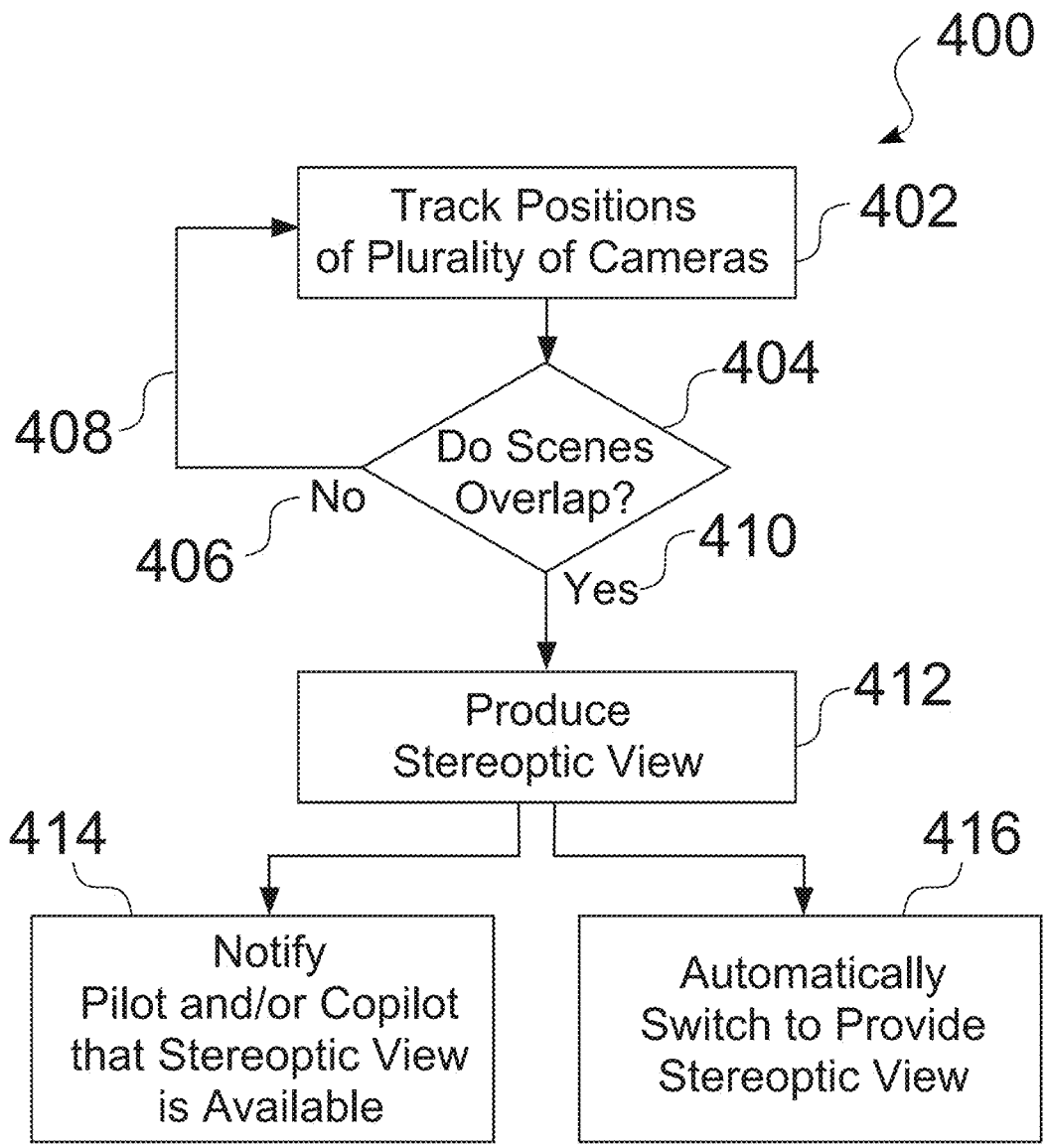
FIG. 4 is a flowchart of an illustrative method for producing a stereoptic view for overlapping scenes of tracked camera positions.

FIG. 1 is a partial schematic view of an illustrative stereoptic vision system 10 having separate inputs 24 from cameras or optical devices 12. FIG. 2 is a schematic view of an operating environment 200 in which an illustrative stereoptic vision system 10 can be used, such as with respect to an X-axis 220x, a Y-axis 220y, and a Z-axis 220z. FIG. 3 is schematic view 300 of camera baselines 16 as a function of camera rotation 304 for different viewers USR, e.g., a pilot 208a and a copilot 208b. FIG. 4 is a flowchart of an illustrative method 400 for producing a stereoptic view for overlapping scenes of tracked 402 camera positions.

Stereoptic views produced 412 by the system 10 can be enhanced by combining images obtained from at least two independent or independently operated cameras 12. In an illustrative system embodiment 10, such as shown in FIG. 1, FIG. 2 and FIG. 3, two independent cameras 12 are mounted on the heads of a helicopter pilot 208a and a co-pilot 208b. In some embodiments, the cameras 12 can be enabled for any of night vision, thermal vision, or other purposes. Because the cameras 12 are mounted to the helmets, e.g., 1002 (FIG. 23), the pilot 208a and co-pilot 208b can select what they wish to view, i.e., the scene 212, e.g., 212a and 212b, by moving their heads. At any given time, the pilot 208a and co-pilot 208b may be looking at different scenes 212, but in many instances there is a significant overlap 214 in the scenes 212.

By utilizing position sensors 302 (FIG. 3) mounted in the helmet 1002 or the camera 12, the system 10 is able to determine 404 (FIG. 4) when the scenes 212 viewed by the pilot 208a and co-pilot 208b overlap 214. When such an overlap 214 is determined 404 to exist 410 (FIG. 4), some embodiments of the system can notify 414 (FIG. 4) the pilot 208a and co-pilot 208b that an enhanced stereoptic view is available, and/or the system 10 can automatically switch 416 (FIG. 4) to provide the enhanced stereoptic view.

This enhanced image is created 412 (FIG. 4) by using the left camera image from the individual, e.g., 208b, seated in the left seat for the left eye and the right camera image from the individual, e.g., 208a, seated in the right seat for the right eye. The resulting enhanced stereoptic view has a significantly larger baseline than a human USR would normally be capable of seeing. This resulting enhanced stereoptic view can enable the users USR, e.g., 208a and/or 208b, to more accurately determine the difference in depth between two or more distant objects 206 (FIG. 2).

Because the cameras 12 are interdependently operated, the scenes 212, e.g., 212a, 212b (FIG. 2) from each individual may not overlap perfectly. To compensate for the lacking scene information, some embodiments of the system 10 can attempt to extrapolate the missing information, crop the scenes to only those portions which overlap or simply leave the missing scene information blacked out, essentially resulting in monocular vision in these areas. In some embodiments, the images are manipulated, such as to compensate for slight variations of camera positioning, such as camera height.

Such a system is not limited to the pilot and co-pilot scenario, but may be utilized in any situation in which there are two or more independent or independently operated cameras 12. This system may also be incorporated in a machine vision system in which otherwise independent cameras 12 can be fused together for specific tasks to allow for better depth perception.

For instance, in an illustrative alternate embodiment a pilot 208a of an aircraft 202 can have an associated camera 12 and position sensor 302, while a second camera 12 can be separated 16 from the first camera, at either a fixed position on the aircraft 202 or movable with respect to the aircraft 202. In some embodiments in which the secondary camera 12 is located at a known position, a corresponding position sensor 302 is not required. Some embodiments can include more than one fixed camera, such as opposing fixed secondary cameras located on opposing wings of a fixed wing aircraft 202, in which the secondary camera 12 to be used may be determined based on any of position, orientation, or availability. In some embodiments in which the secondary camera 12 is movable, the position of the camera can be selectively controlled, such as to aid in any of depth perception or viewing around occlusions or obstacles 206.

An illustrative embodiment can include, inter alia: a non-transitory computer readable medium having stored thereon a computer program having machine-readable instructions for performing, when running on a computer, a method comprising tracking of the position and orientation of at least two independently operable cameras that are separated from each other by a baseline difference, wherein each of the cameras has a corresponding field of vision, determining if the fields of vision of the cameras at least partially overlap, using the tracked positions and orientations of the cameras, and producing a stereoscopic view using images from the cameras when the fields of vision overlap.

3D Depth Map Used to Augment Stereo Vision

Figure 5:
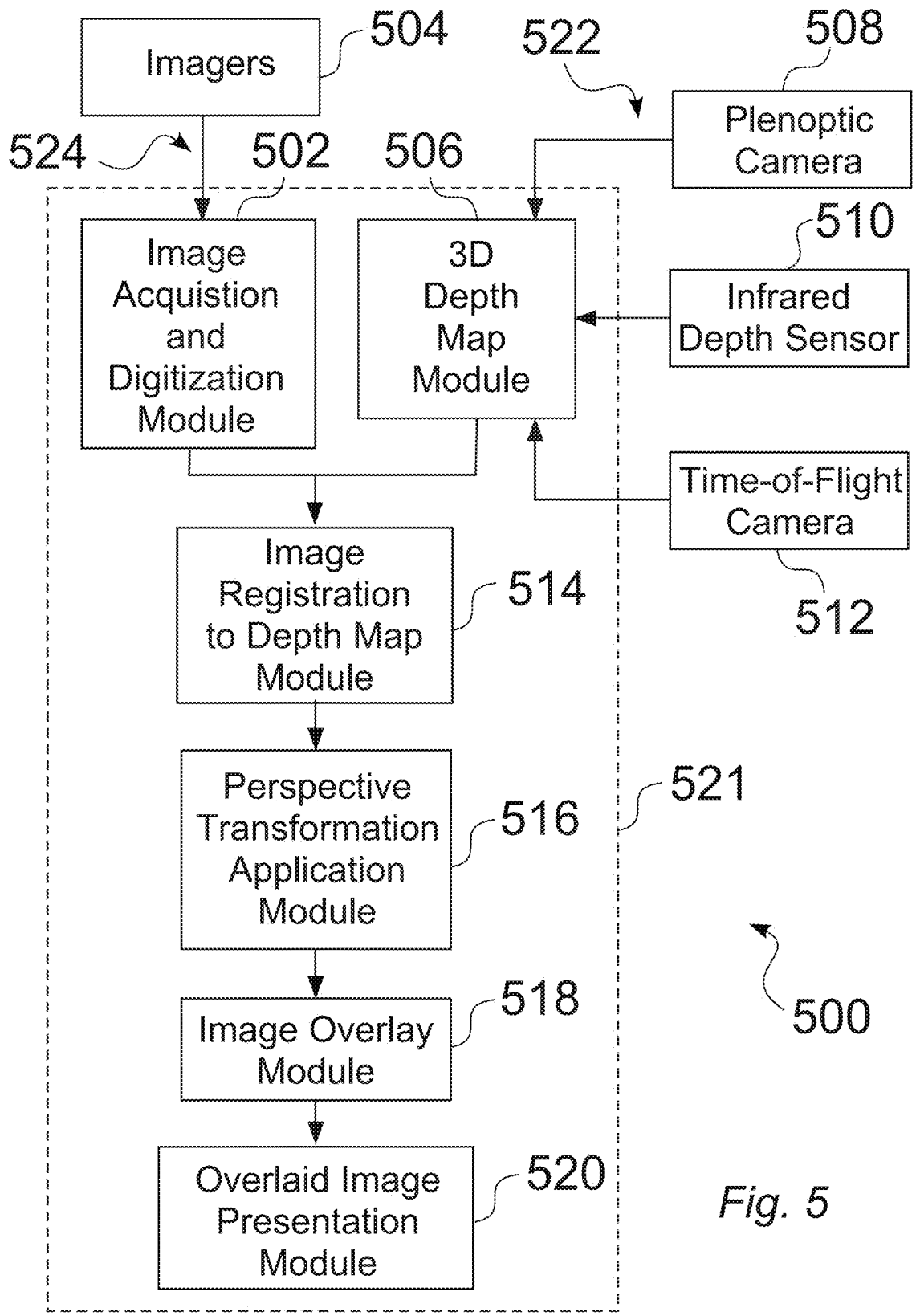
FIG. 5 shows an illustrative system for augmenting stereo vision using a three-dimensional (3D) depth map.
Figure 6:
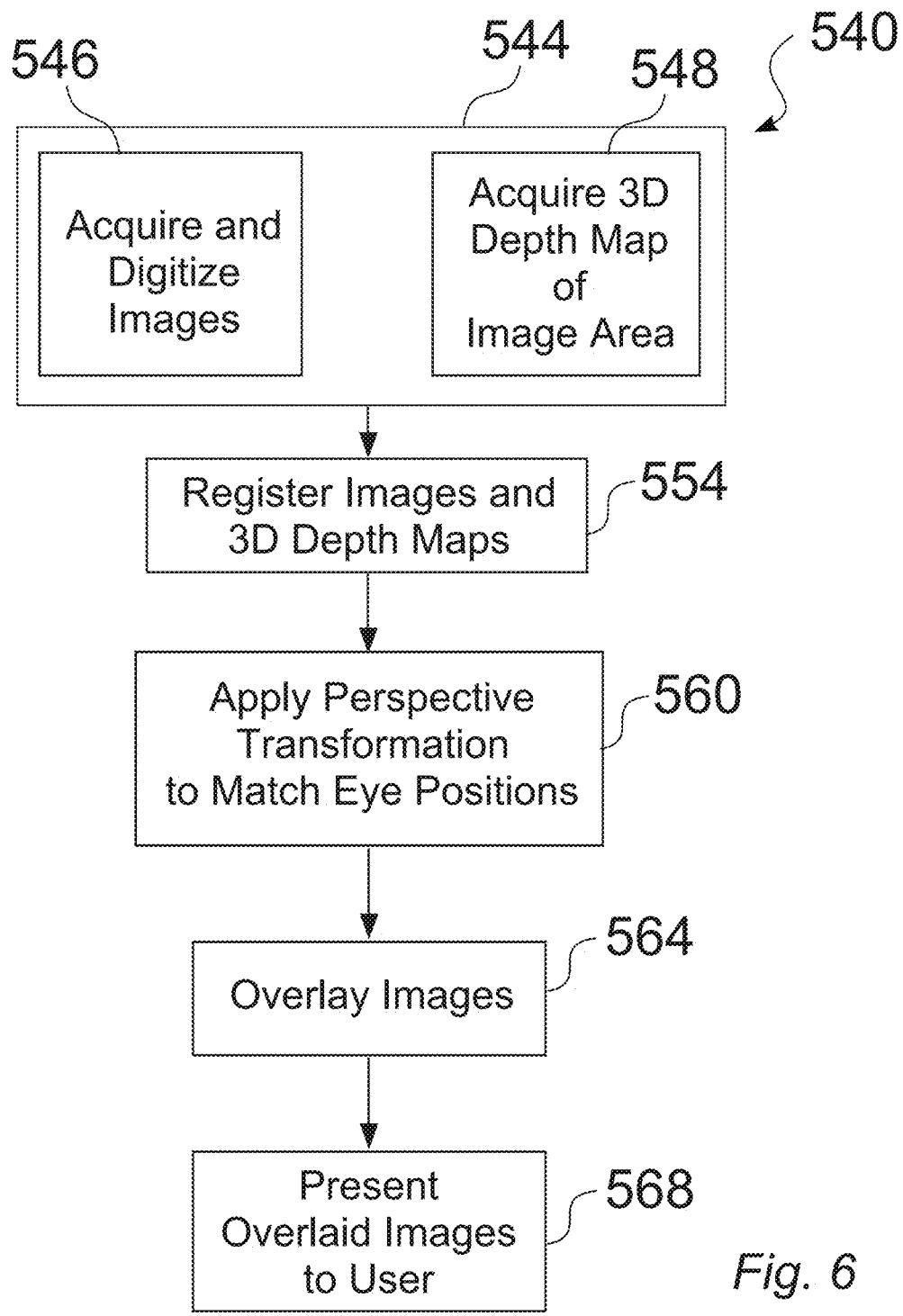
FIG. 6 shows an illustrative method for augmenting stereo vision using a three-dimensional (3D) depth map.

FIG. 5 shows an illustrative system 500 for augmenting stereo vision using a three-dimensional (3D) depth map 506. FIG. 6 shows an illustrative method 540 for augmenting stereo vision using a three-dimensional (3D) depth map 506.

The illustrative system 500 seen in FIG. 5 includes an image acquisition and digitization module 502, which is configured to receive images from one or more imagers 504, such as through a wired or wireless connection 524. The illustrative system 500 seen in FIG. 5 also includes a 3D depth map acquisition module 506, that is configured to receive depth map information for any of sensors, cameras or other imaging devices, such as through any of wired or wireless connections. One or more modules of the illustrative system 500 can be integrated within an enclosure 521, such as a standalone enclosure, or integrated within other devices, such as within a vehicle or aircraft 202, or within a helmet or goggles, e.g., 20. One or more of the functional modules 502, 506, 514, 516, 518, 520 can include any of a local processor 1202 (FIG. 24), or can be controlled by one or more system processors 1202, such as through a system bus 1210.

An illustrative binocular color night vision system 500 can use a high-resolution depth map 506 to present 568 (FIG. 8) binocular images that are readily fused by the user USR. This provides the user USR with an improved sense of depth and an enhanced understanding of his or her surroundings.

The system 500 acquires 546 (FIG. 6) a set of images from multiple imagers 504, for example color-filtered image intensifier tubes or image intensifier tubes with photocathodes with specific spectral sensitivities. Each of the images is then digitized.

The system 500 additionally acquires 548 (FIG. 6) a digital depth map of the field of view spanned (in aggregate) one or more of the imagers. The system 500 registers 554 (FIG. 6) each of the acquired images to the depth map 504.

For each of the acquired images, the system then generates 560 (FIG. 6) a modified image for each of the user's two eyes by applying a perspective transformation, such as based on a human baseline 18 (FIG. 1), which in some embodiments corresponds to the distant between display screens 22 for goggles, e.g., 20. The perspective transformation shifts each pixel within the acquired image 502 by an amount determined by (a) the depth of the pixel as indicated by the depth map 504, and (b) the offset, i.e., the baseline, between the acquiring imager and the user's eye. Each of the modified images 516 thus alters the acquired imagery to appear as it would from one of the user's two eyes.

The resulting pairs of images 516 are digitally overlaid 564 (FIG. 6) and presented 568 (FIG. 6) to the user USR.

The system 500 can acquire 504 the depth map using any of a number of techniques. For example, the system 500 may use an infrared depth sensor 510, e.g., Microsoft Kinect) or a time-of-flight (ToF) camera 512, e.g., a SwissRanger, such as currently available from Mesa Imaging AG, of Rüschlikon, Switzerland.

In some preferred embodiments 500, the depth map is acquired 504 using a plenoptic camera 508, i.e., a light-field camera, which, as a passive imager, is advantageous for clandestine applications. In some system embodiments 500, the plenoptic camera 508 comprises an array of microlenses, with complementary color filters that are assigned to individual microlenses. For instance, a portion of the microlenses of an imager 504 can be used to acquire 546 the color imagery, while the remaining portion 508 (FIG. 5) of the micro-lenses, which is preferably interleaved in some embodiments, can be used to acquire 504 the depth map.

In some embodiments, any of the acquired images and 3D depth map are filtered through one or more filter. In some embodiments, the filters can be cyan, magenta, and yellow, while others may be filtered for infrared bands and other multispectral information. In some embodiments that include microlenses, the microlenses can be left unfiltered. In some embodiments, the resulting array resembles a Bayer filter, in that color information is gathered while avoiding the need to de-Bayer. It should also at the same time generate a depth map 506 for 3D information.

An illustrative embodiment of the binocular night vision method 540 comprises, when operating within an image area, acquiring 546 left and right images 502 of the image area, acquiring 548 three-dimensional (3D) depth maps 506 of the image area, registering 554 the acquired images 502 with the corresponding 3D depth maps 506, applying 560 perspective transformations 516 to match eye positions of a viewer USR, overlaying 564 the images to produce binocular images, and presenting 568 the binocular images to the viewer. In some embodiments, the 3D depth map 506 is acquired through any of a plenoptic camera 508, an infrared depth sensor 510, or a time-of-flight camera 512. In some embodiments, the presented binocular images are configured to provide a viewer USR with any of an improved sense of depth and an enhanced understanding of the viewer's surroundings. In some embodiments the method can include filtering any of the acquired images 502 and the 3D depth maps 506, wherein the filtering includes any of color filtering though cyan, magenta and yellow filters, infrared filtering, or filtering for other multispectral information.

Depth Map Applied to Information Overlays to Resolve Occlusions

Figure 7:
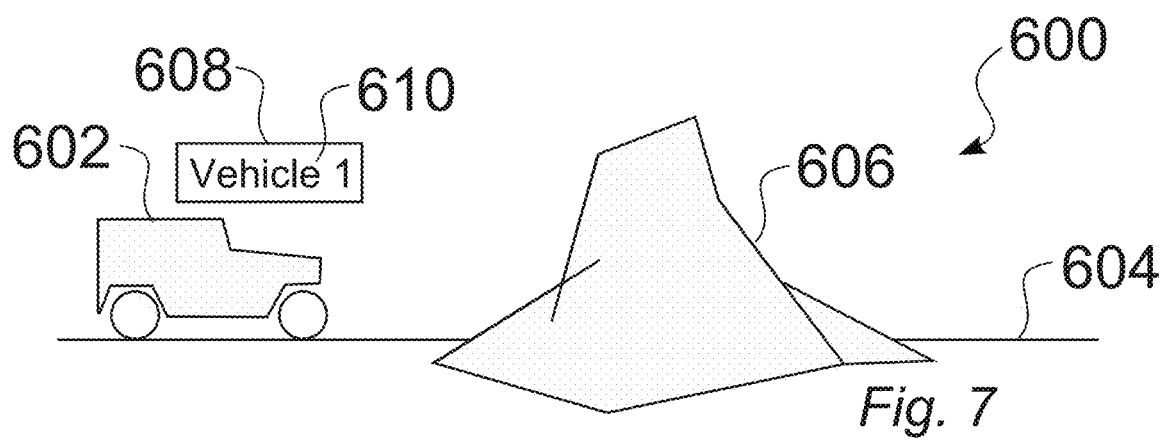
FIG. 7 shows a schematic view of system embodiments in which a depth map can be applied to an information overlay to resolve occlusions.

FIG. 7 is an illustrative view of an image corresponding to a scene 212 in which overlaid information 608, 610 can be applied with respect to one or more objects 602, 606. The overlaid information seen in FIG. 7 includes a graphic element 608 and/or a label 610, such as to conveying information regarding one or more identified objects 602 and/or 606.

Figure 8:
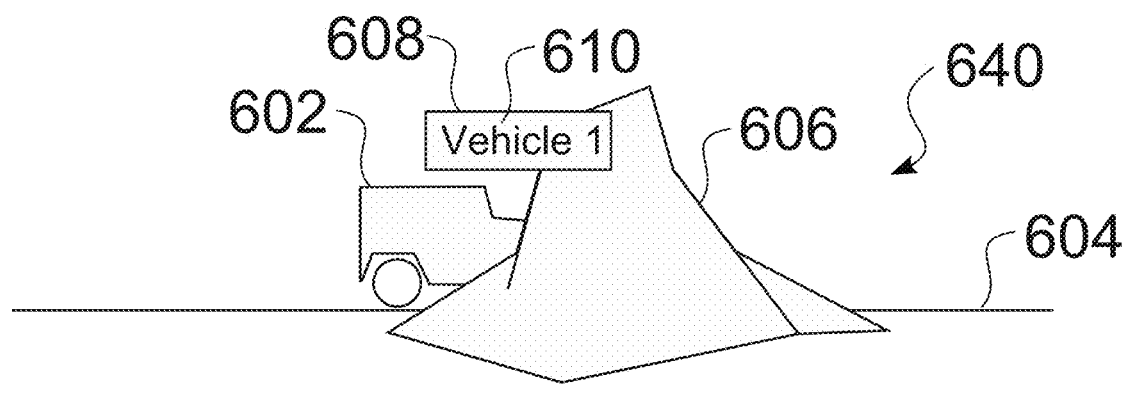
FIG. 8 shows a schematic view of system embodiments in which a depth map can be applied to an information overlay to resolve occlusions.
Figure 9:
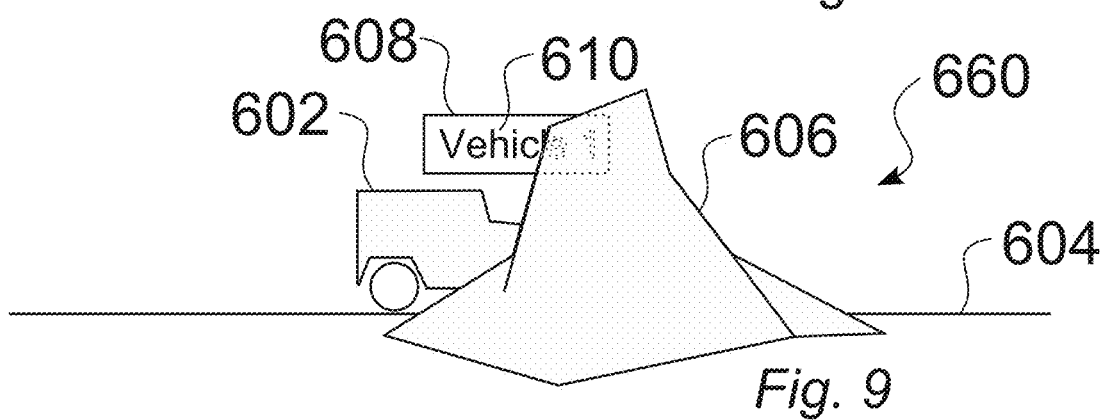
FIG. 9 shows a schematic view of system embodiments in which a depth map can be applied to an information overlay to resolve occlusions.
Figure 10:
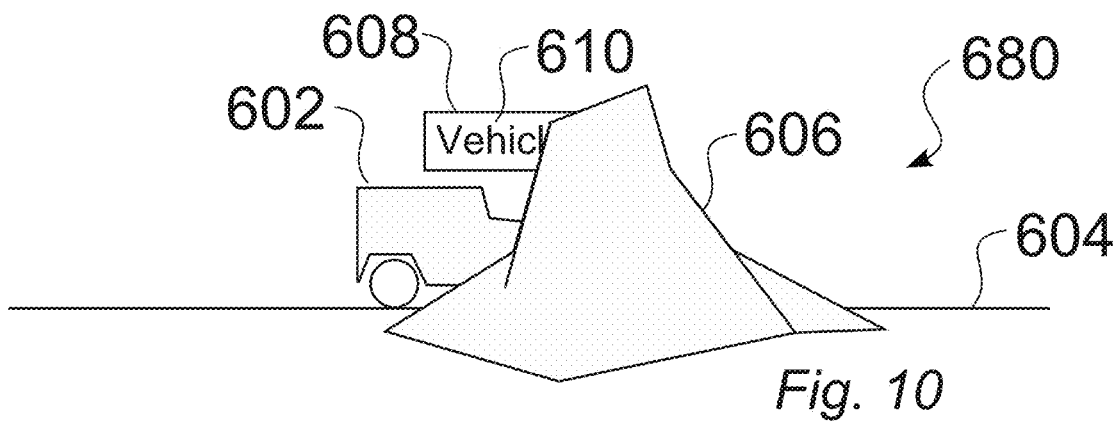
FIG. 10 shows a schematic view of system embodiments in which a depth map can be applied to an information overlay to resolve occlusions.

FIGS. 8-10 show schematic views of system embodiments 500 in which a depth map 504 applied to an information overlay to resolve occlusions.

For instance, the illustrative systems 500 can overlay supplementary content 608,610 with an appropriate binocular disparity based on the depth map. For example, informational overlays, i.e., labels, corresponding to objects at particular locations within the field of view can be generated in each eye with appropriate binocular disparity based on the value of the depth map 504 at that particular location.

In some embodiments, when the system 500 detects that a tracked object, e.g., 602, has been occluded by another, nearer object, e.g., 606, the system can alter the overlay 608, 610, to lessen the potential distractions described above, using one of three approaches.

For example, as seen in FIG. 8, the system 500 can remove 640 (FIG. 8) the overlay 608,610 from being displayed, such as to one of the user's eyes. As seen in FIG. 9, some embodiments of the system 500 can render 660 the overlay 608,610 in a semi-transparent or otherwise de-emphasized manner. As seen in FIG. 10, some embodiments of the system can remove, i.e., "knock out" 680 a portion of the overlay 608,610 that is occluded by a nearer object, e.g., 606.

In the approach 640 seen in FIG. 8, the user USR will not attempt to "fuse" the overlay. The user USR will thus not perceive the label at any particular depth, removing any possible conflict with the user's mental model of the scene 212. In the approach 660 seen in FIG. 9, the overlay 608,610 can be presented at the depth of either the occluding or occluded (tracked) object. In the first case 640 seen in FIG. 8, the depth map 504 is strictly respected. In the second case 660 seen in FIG. 9, the overlay is generated at the "last seen" depth of the tracked object 602. In either case 640,660, the semi-transparent appearance of the overlay 608,610 lessens the user's impression of its physical nature, lessening the impact of the non-physical behavior of either a jump forward to the occluding object depth or a mismatch in occlusion behavior of the overlay and tracked object. In the third case 680 seen in FIG. 10, the remaining portion of the overlay 608,610 is presented at the depth of the tracked object 602, removing the non-physical behavior entirely.

An illustrative embodiment of the method for overlaying information 608,610 on an acquired image for presentation to a viewer comprises acquiring one or more images of a scene at a particular location, wherein the scene includes a plurality of objects, e.g., 602,610, using one or more image capturing devices each having a corresponding field of view. The illustrative method tracks an object within the scene, and generates an informational overlay 608,610 that corresponds to the tracked object at a particular location within the field of view for each of the viewer's eyes, with binocular disparity based on a value of depth map at the particular location. Upon determining that a tracked object 602 has been occluded by another object 606 within the acquired images, the method alters a display of the informational overlay 608,610, based on the occlusion. In some embodiments, the altering of the display of the informational overlay 608,610 includes removing the informational overlay from being displayed to at least one of the viewer's eyes. In some embodiments, the altering the display of the informational overlay 608,610 includes rendering at least a portion of the informational overlay 608,610 in any of a semi-transparent or de-emphasized manner, such as shown in FIG. 9. In some embodiments, the altering of the display of the informational overlay 608,619 includes removing a portion of the informational overlay that 608,610 is occluded by the nearer object, such as seen in FIG. 10.

Direct Painting of Overlay Information onto Phosphor Screen

For some applications, it can be useful to overlay the above symbology or messages without bulky optical elements or passing through a digital sensor and display.

Figure 11:
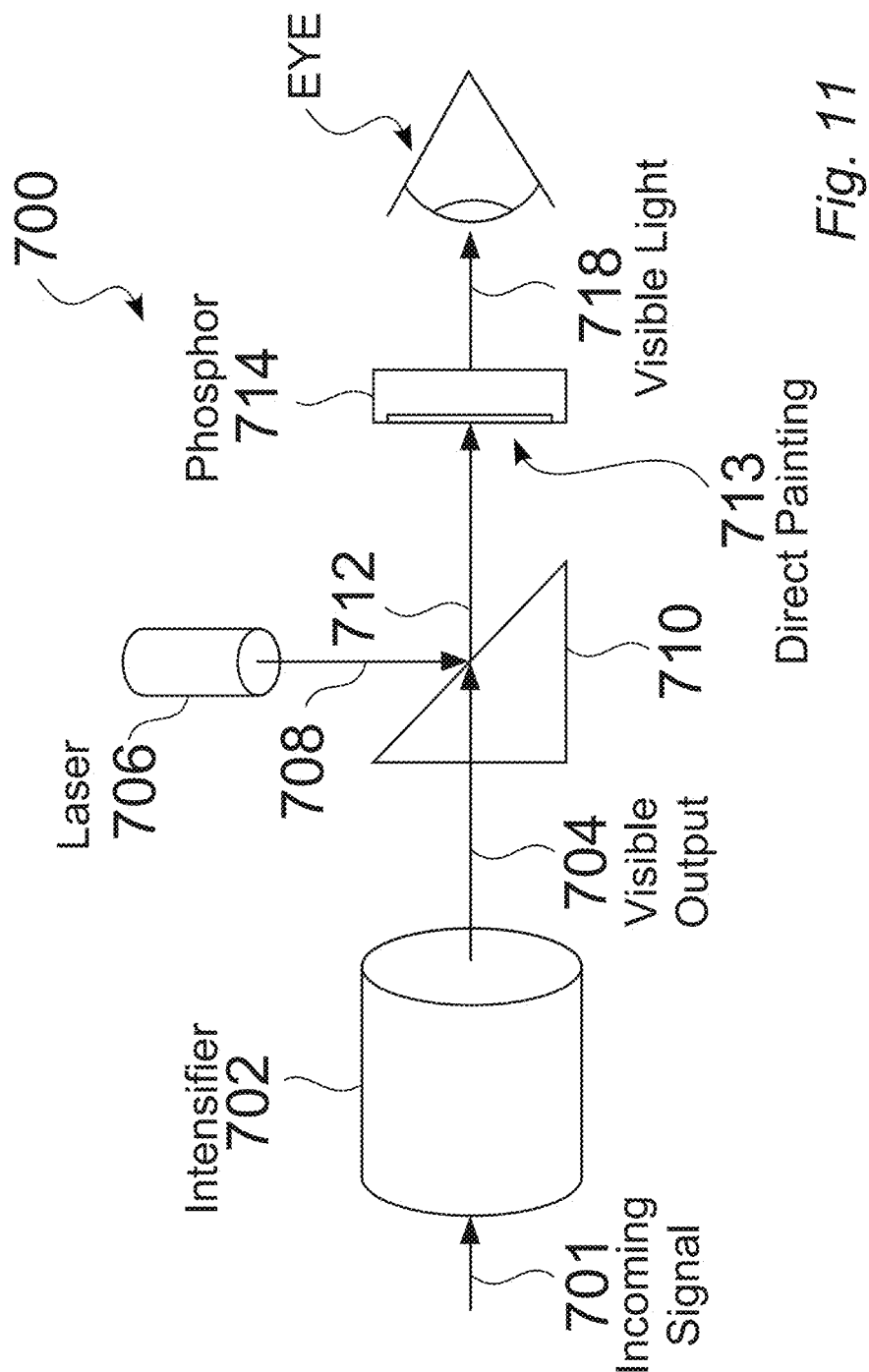
FIG. 11 is a schematic view of an illustrative system for direct painting of overlay information onto a phosphor screen.
Figure 12:
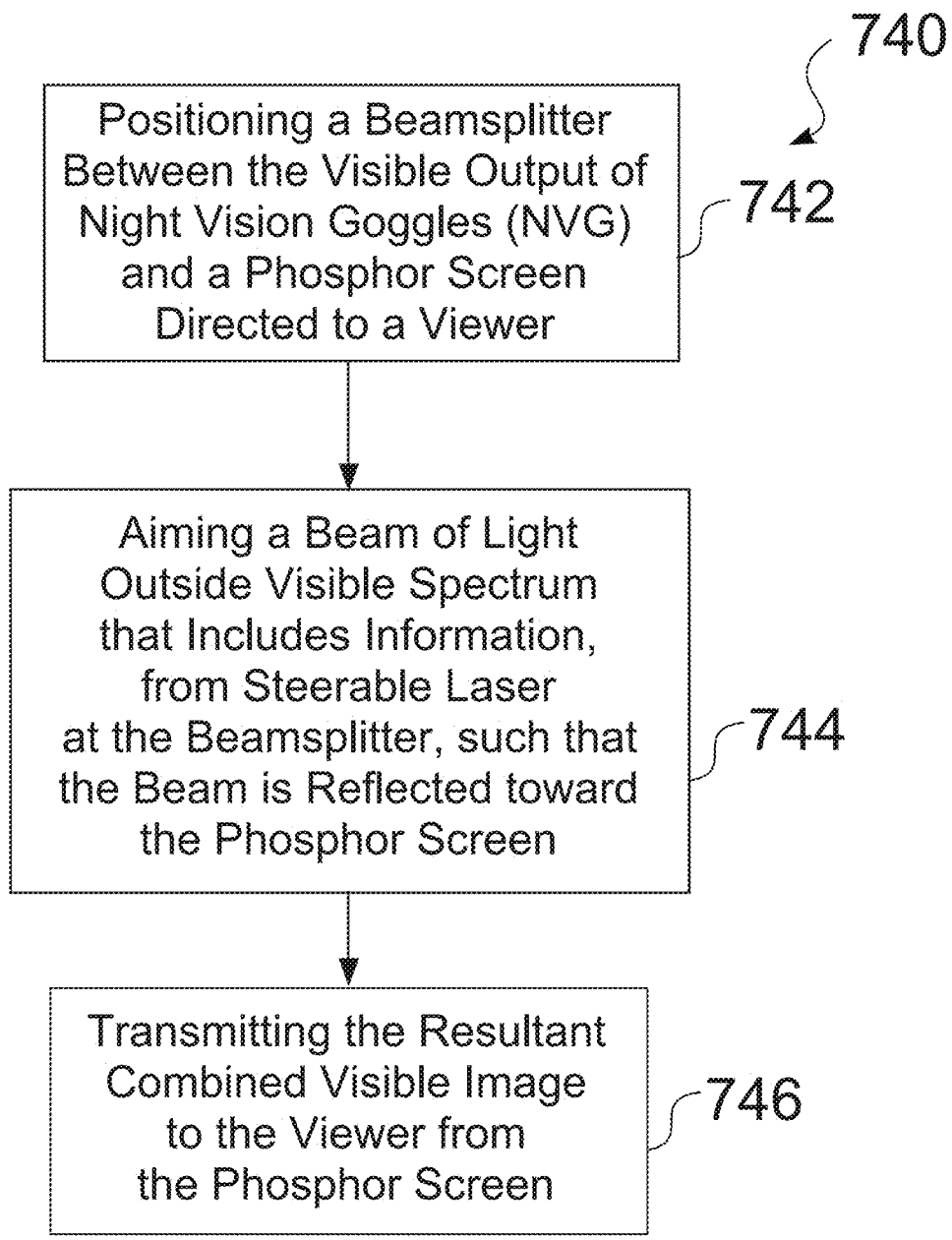
FIG. 12 is a flowchart of an illustrative method for direct painting of overlay information onto a phosphor screen.
Figure 13:
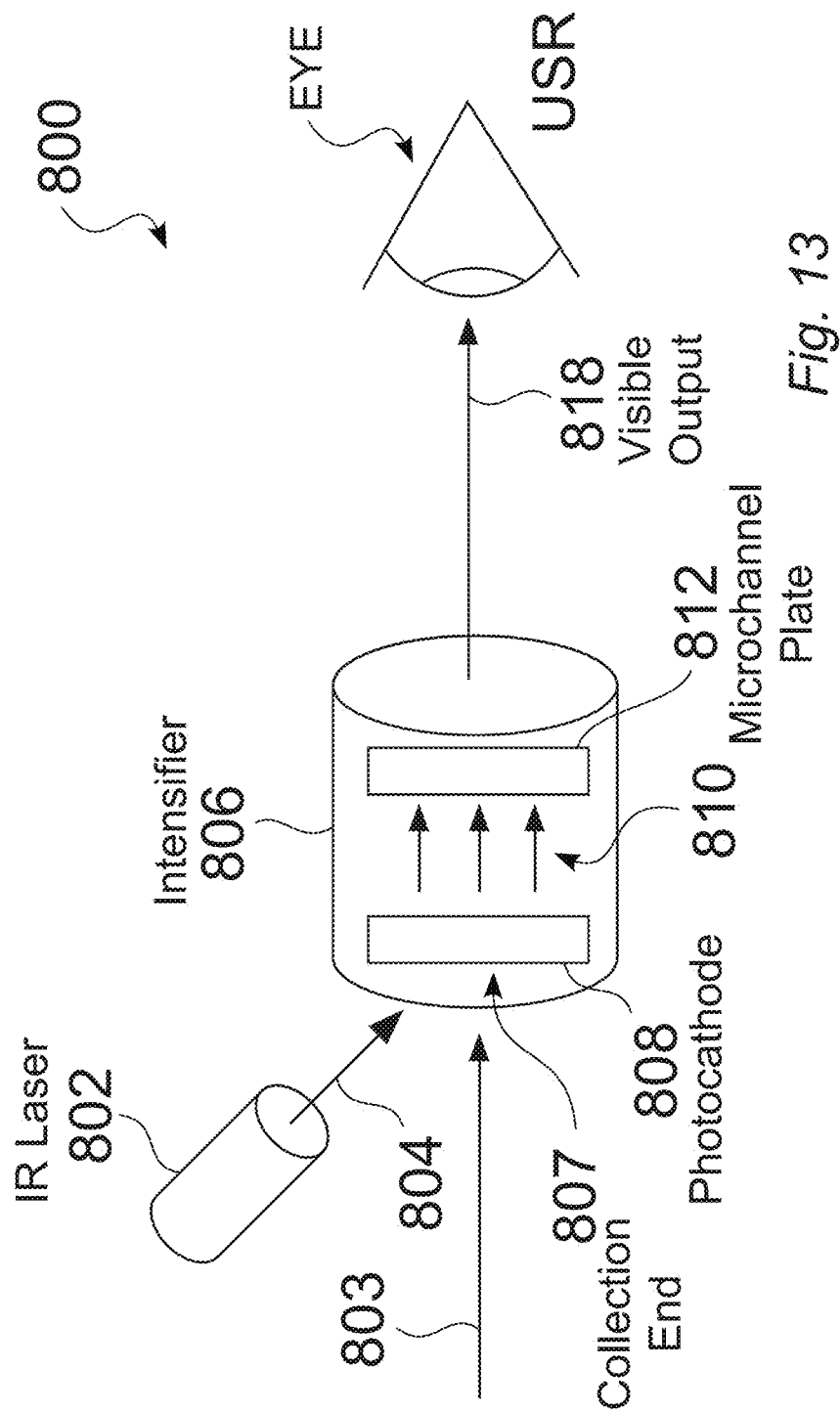
FIG. 13 is a schematic view of an alternate illustrative system for direct painting of overlay information onto a phosphor screen.
Figure 14:
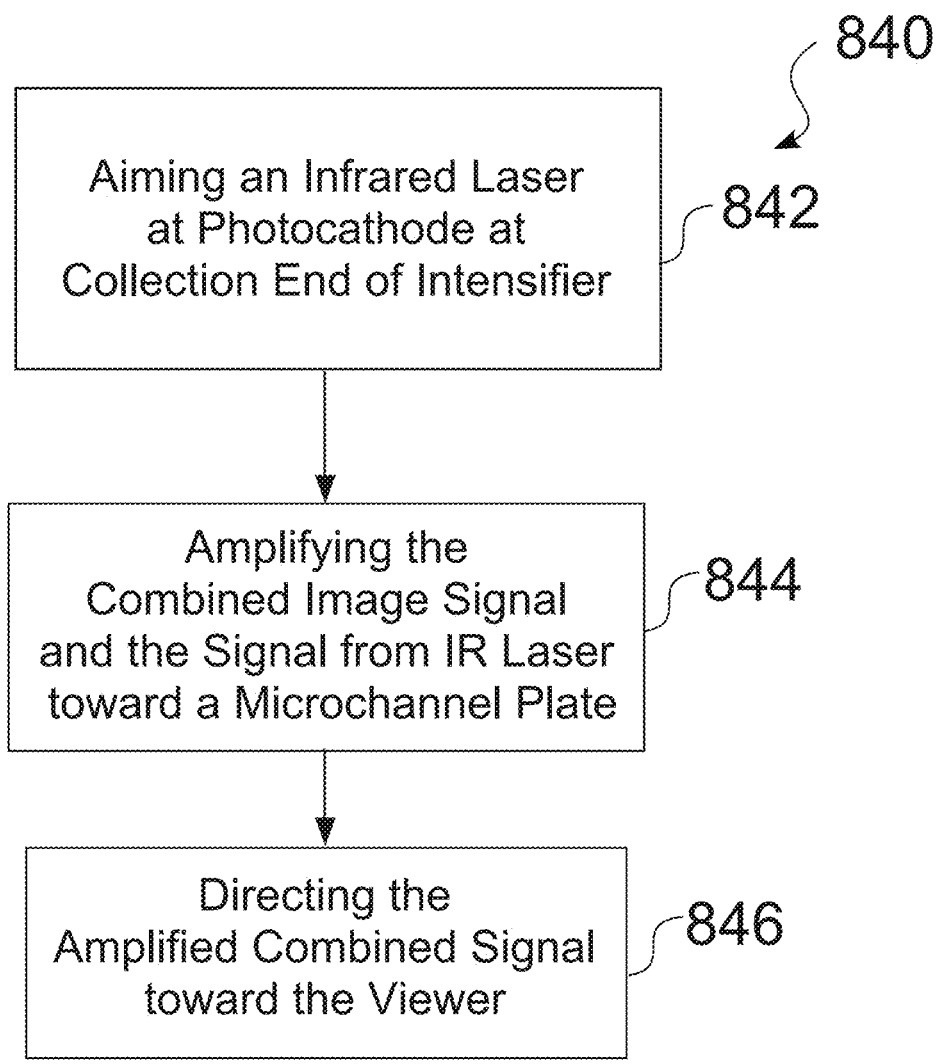
FIG. 14 is a flowchart of an alternate illustrative method for direct painting of overlay information onto a phosphor screen.

FIG. 11 is a schematic view of an illustrative system 700 for direct painting of overlay information onto a phosphor screen 714. FIG. 12 is a flowchart of an illustrative method 740 for direct painting 746 of overlay information onto a phosphor screen 714, using the system 700 seen in FIG. 11. FIG. 13 is a schematic view of an alternate illustrative system 800 for direct painting of overlay information onto a phosphor screen 812. FIG. 14 is a flowchart of an alternate illustrative method 840 for direct painting of overlay information onto a phosphor screen 812, using the system 800 seen in FIG. 13.

To generate symbology on a night vision view, as disclosed herein, some embodiments of the system, e.g., 700, 800, can "paint" information with beams outside the visible spectrum, directly onto a phosphor screen 714,812, causing re-emission in the visible spectrum 718,818 to the user's eye.

In the illustrative embodiment 700 seen in FIG. 11, a beamsplitter 710 that is enabled to reflect ultraviolet light and transmit visible light is positioned 742 between the NVG output 704 and the user's eye. A steerable laser 706 in the ultraviolet range is aimed 744 at the beamsplitter 710, such that its beam 708 is reflected 712 towards the phosphor screen 714. When the beam 712 hits the screen 714, its energy causes photons to be emitted 718 towards the user's eye. Thus, a steerable UV beam 708 can paint symbology, e.g., 608, 610 (FIGS. 7-10) onto the phosphor screen 714, which the user will see overlaid 746 on the amplified analog image 704.

In an illustrative embodiment a method comprises positioning a beamsplitter 710 that is enabled to reflect light 708 outside the visible spectrum, and to transmit visible light 704 between the output of an image intensifier 702 associated with night vision goggles (NVG) and a phosphor screen 714. The illustrative method aims a steerable laser 706 having an output beam 708 of the light outside the visible spectrum at the beam splitter 710, such that the light 708 outside the visible spectrum is reflected toward the phosphor screen 714, wherein the light outside the visible spectrum includes information, e.g., 608,610, wherein the output of the beamsplitter 710 includes both the visible output 704 of an image intensifier and the light 708 outside the visible spectrum that includes the information, and wherein the output of the beamsplitter 710 is painted 713 directly on the phosphor screen 714, to be emitted 718 from the phosphor screen in a visible spectrum for viewing by a viewer USR. In some embodiments, the light 708 outside the visible spectrum is ultraviolet (UV) light.

In the second embodiment 800 seen in FIG. 13, the output 804 of a very low-powered infrared laser 802 is aimed 842 at the photocathode 808 at the collection end 807 of the NVG intensifier 806. The IR energy 804 impacts the visible and IR sensitive photocathode 808, and causes electrons 810 to emit towards the microchannel plate 812 to be amplified 844. In a similar manner to the embodiment 700, the steerable IR laser 802 can be enabled to draw information 804 onto the photocathode 808, wherein the information 804 is amplified 844, along with the scene 212 and transmitted 846 to the eye of the user USR.

An illustrative method comprises aiming an infrared (IR) laser 804 having an IR output beam 804 at a photocathode 808 located at a collection end 807 of an image intensifier 806 associated with night vision goggles (NVG), wherein the photocathode 808 is sensitive to visible energy from a received image signal 803 and IR energy. The illustrative method directs 810 the combined visible energy 803 and IR energy 804 toward a microchannel plate 812, to be amplified as a combined visible output signal 818, which can be directed for viewing by a user USR. In some embodiments, the IR output beam includes information, e.g., text, symbols, and/or other graphics, wherein the amplified combined visible output signal 818 includes the information.

Generating Stereo Information from a Single Lens

Figure 15:
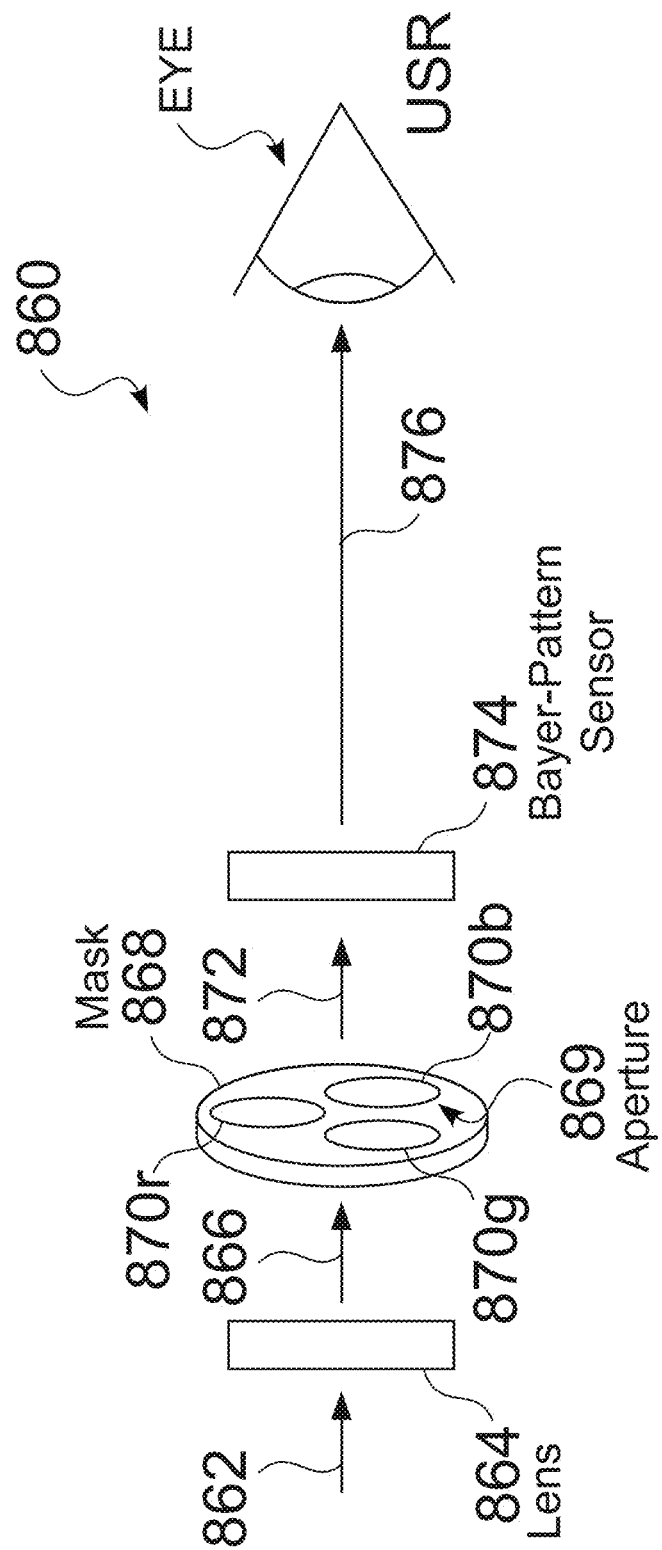
FIG. 15 is a schematic view of an illustrative system for generating stereo information from a single lens.
Figure 16:
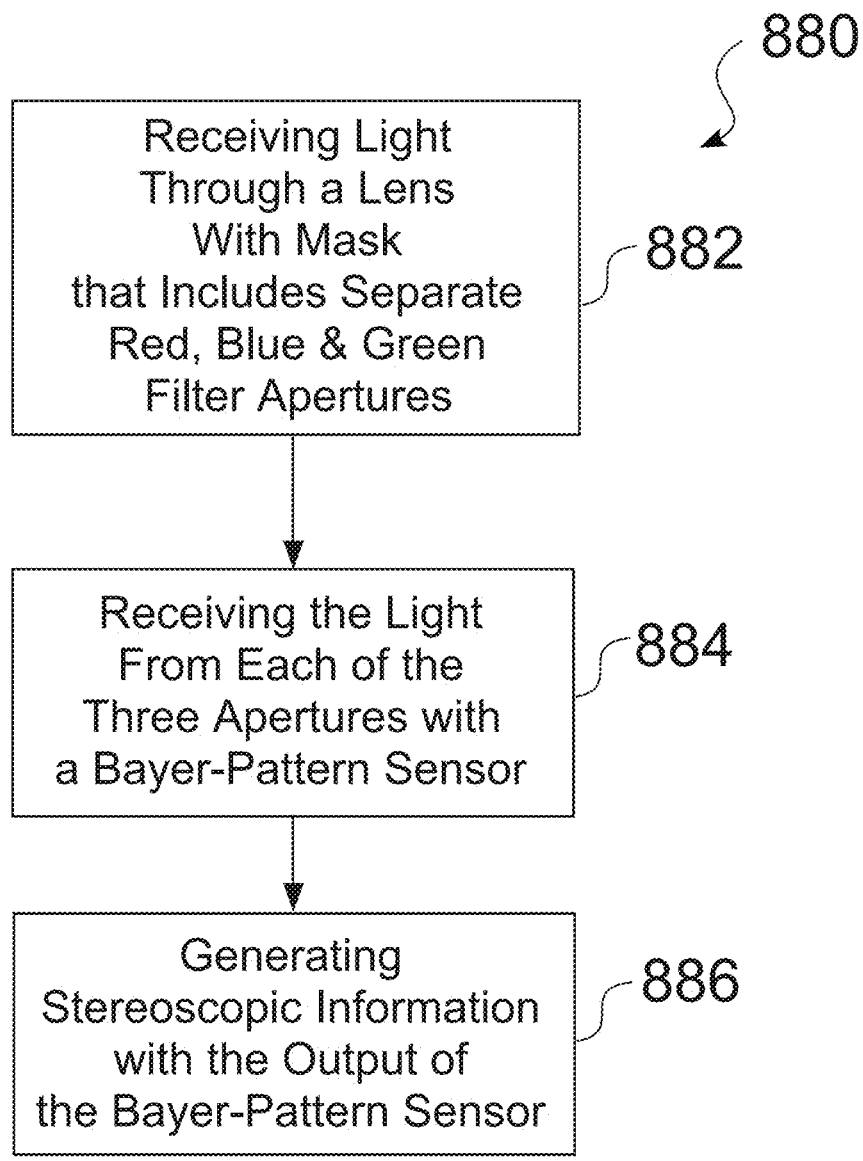
FIG. 16 is a flowchart of an illustrative method for generating stereo information from a single lens.

FIG. 15 is an illustrative view of a system 860 for generating stereo information from a single lens 864. FIG. 16 is a flowchart of an illustrative method 880 for generating stereo information from a single lens 864.

In the illustrative system 860 seen in FIG. 15, a circular mask 868 is placed behind a lens 864, wherein the circular mask 868 includes three apertures 869 defined therethrough, containing a red filter 870r, a blue filter 870b, and a green filter 870g. Incident light 862 is received 882 through the lens 864 and is directed 866 through the filters 870, e.g., 870r, 870b, 870g. A Bayer-pattern sensor 874 is configured to receive 884 light 872 from each of the three apertures 869, wherein each pixel in the Bayer-pattern sensor 874 only accepts light of its color. The output of the Bayer-pattern sensor 874 can be used to generate 886 stereo information on a limited baseline, such as corresponding to the up to the width of the lens (e.g., 15 mm).

An illustrative method comprises receiving light 866, that is transmitted 862 through a single lens 864, at a mask 868, e.g., a circular mask 868 that includes three apertures 869 defined therethrough, containing a red filter 870r, a blue filter 870b, and a green filter 870g, wherein incident light 862 that is received through the lens 864 is directed through the filters 870. The method then receives the light 872 directed from each the filters 870 with a Bayer-pattern sensor 874 having associated pixels, wherein each pixel in the Bayer-pattern sensor 874 only accepts light 872 of a corresponding color. The method generates stereo information with the output of the Bayer-pattern sensor 874, wherein the stereo information corresponds to a baseline, which can have a distance that is less than or equal to the width of the lens.

Figure 17:
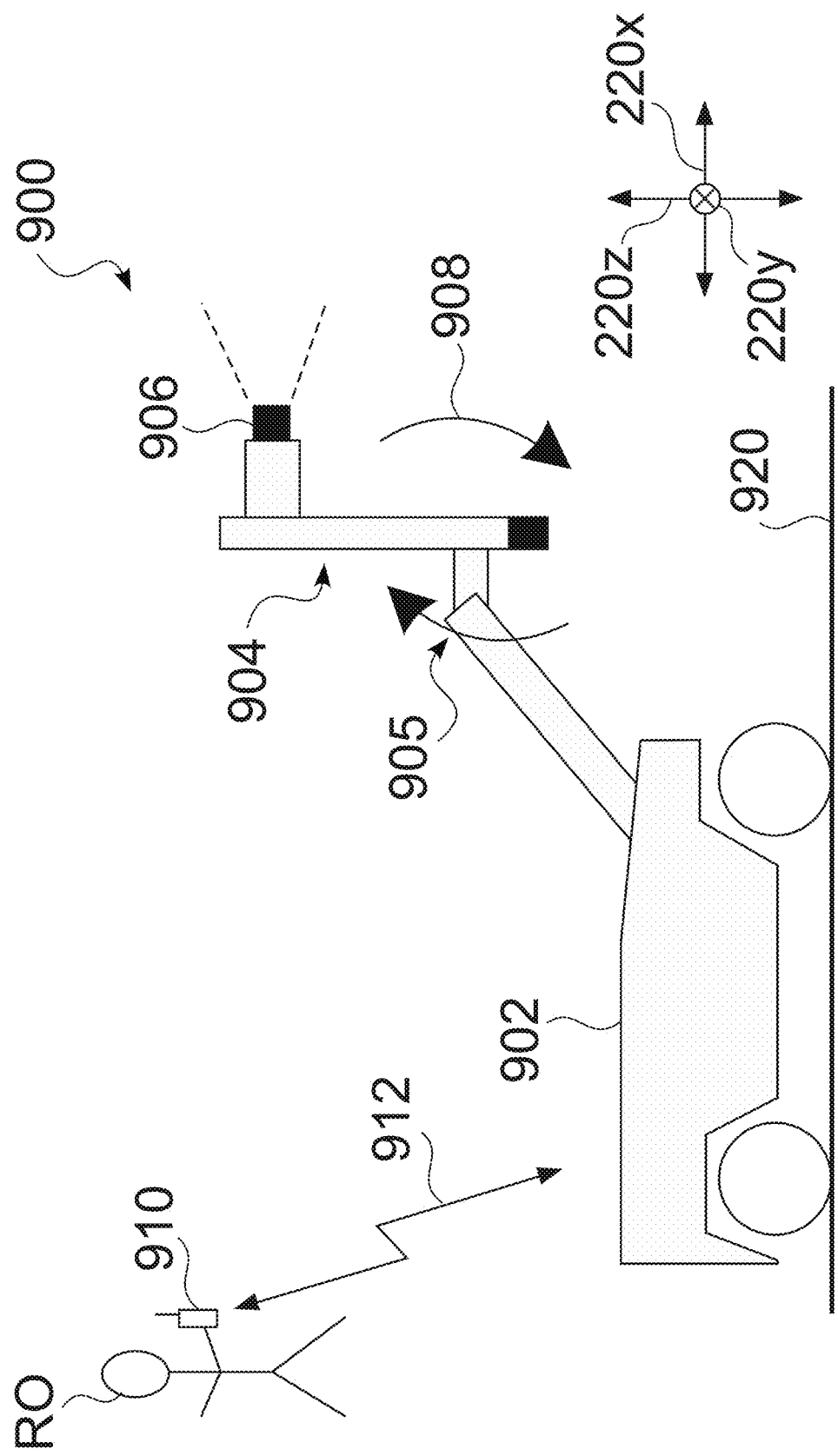
FIG. 17 is a schematic view of an alternate illustrative system for generating stereo information from a single lens.
Figure 18:
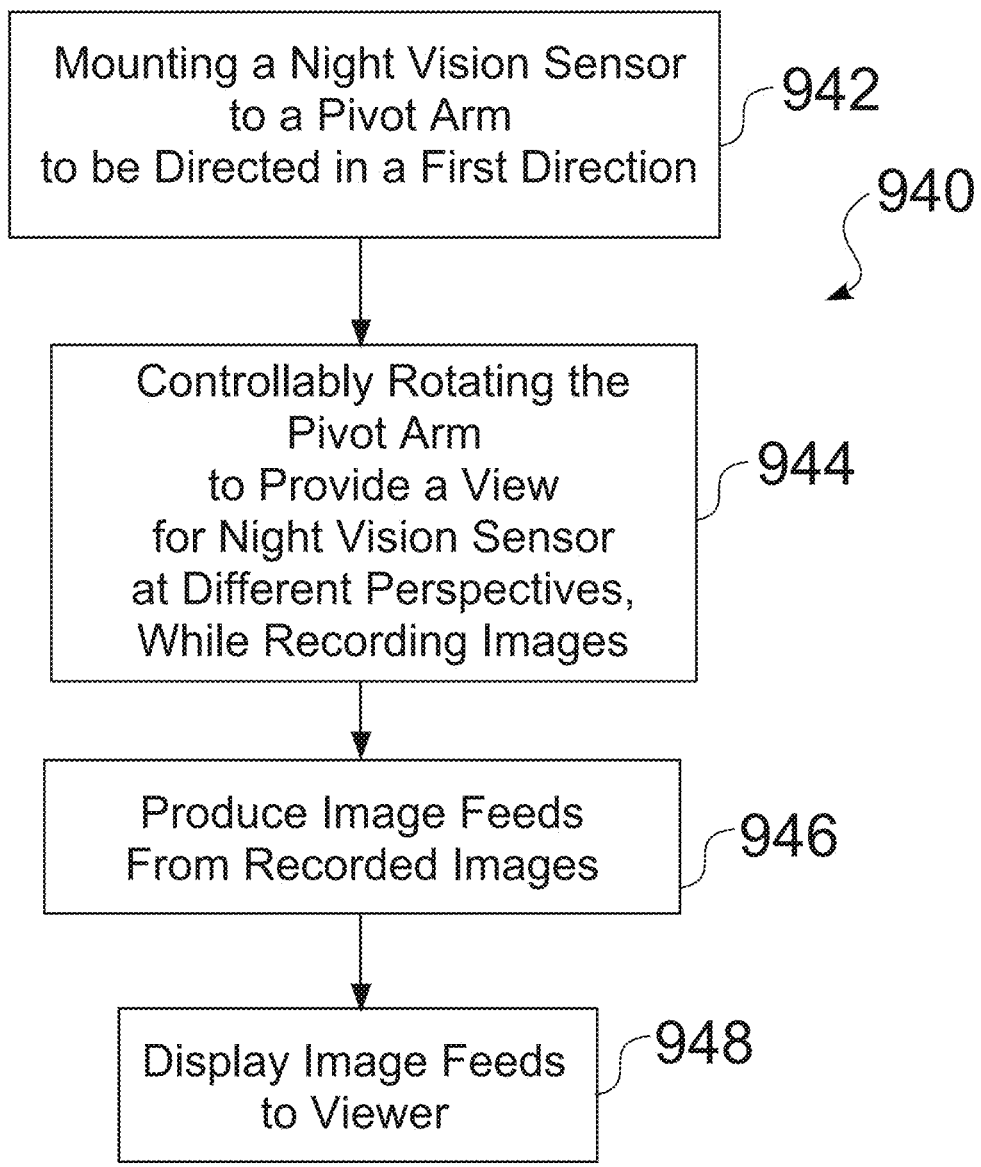
FIG. 18 is a flowchart of an alternate illustrative method for generating stereo information from a single lens.

FIG. 17 is a schematic view of an alternate illustrative system 900 for generating stereo information from a single lens 906. FIG. 18 is a flowchart of an illustrative method 940 for generating stereo information from a single lens 960, such as using the system 900 seen in FIG. 17.

Some embodiments of the alternate illustrative system 900 seen in FIG. 17 can be used for remote controlled vehicles 902, which are sometimes used to explore environments 920, e.g., underground passages 920, and can be enabled to avoid detection. As a result, some of these vehicles 902 are equipped with night vision sensors 906, which allow an above ground remote operator RO to control and navigate the vehicle 902 with a remote device or system 910. Night vision sensors 906, specifically color night vision sensors, can be expensive, large and sensitive to movement. In contrast to prior systems, some systems are enabled to use monocular vision, which results in very poor depth perception, such as the inability of the operator to determine the scale of vertical objects such as holes on the ground.

In the embodiment 900 shown in FIG. 17, a sensor 906 is oriented so that it looks forward from the vehicle 902 on a plane parallel to the ground. A periscope like device 904 is then placed inline with the night vision system 900. The periscope 904 is affixed to a pivot 905 on the vertical plane along the z-axis of the night vision system. As a result, in some embodiments, the periscope 904 can rotate 908 so that it provides a view from both a higher and lower perspective. In some embodiments, the periscope 904 can also be rotated to provide a right and left perspective.

In some embodiments, the periscope 904 constantly rotates, e.g., at a rate of at least 30 times per second. During this rotation, the night vision system 900 can constantly record images. The video captured by the night vision system 900 can be transmitted 912 back to the remote operator RO. If this feed were to be viewed without further processing, it would display the view directly in front of the remote vehicle 902. However, the perspective of this view would be constantly shifting at least 30 times per second.

Instead, before the resulting video feed is displayed to the operator RO, some embodiments of the system 900 can select two static perspectives, which represent the stereo pairs for binocular vision. The system then displays only video captured at these two locations to the operator RO, such as through the remote device and/or though associated goggles, e.g., 20 (FIG. 1). In some embodiments, some or all of the video from the other perspectives is discarded.

The video feed described above can be displayed to the operator RO as a left and right video feed, likely through a binocular viewing system, such as an Oculus Rift virtual reality headset, available through Oculus VR, LLC, Irvine, CA In doing so, the system provides the operator RO with a binocular view of the underground location 920 in a manner in which the operator RO is able to perceive a sense of depth.

In a current default embodiment, the system 900 selects the two static perspectives as the right-most and left-most perspectives corresponding to 3 and 9 o-clock on a clock face. This orientation provides the largest stereo baseline, which can allow the operator RO to perceive depth even in very distant objects.

In some embodiments, the operator RO can select various stereo pairs. For example, the operator RO may select the 1 and 11 o-clock positions, in which this view would provide the operator RO with a narrow baseline that is appropriate for viewing objects up close. In addition, this view can give the operator RO the perception of having "popped his head up", because the perspective is now more elevated than the default perspective. This elevated perspective can be useful in discerning the scale of vertical objects, such as holes in the ground.

In some embodiments, the remote operator RO can control these various perspectives by simply raising and lowering his or her head if the system is equipped with head tracking. Alternatively, the system 900 may employ a simple joystick that enables the operator to raise and lower his or her perspective.

An illustrative method comprises orienting a night vision sensor 906 on a periscope mount 904 so that the night vision sensor 906 looks forward from a remotely controlled vehicle on a plane, e.g., 220x, parallel to a ground surface 920, wherein the periscope mount 904 is affixed to a pivot 905 on a vertical plane, e.g., 220z, that extends perpendicularly to the ground surface 920. The illustrative method controllably rotates the periscope mount 904 on the pivot 205 to provide perspective views, while capturing video images, and transmits 912 the video images to a remote device 910, such as corresponding to a remote operator RO. In some embodiments, the perspective views are any of higher and lower perspectives, or right and left perspectives. In some embodiments, the periscope mount 905 is constantly rotated at a frequency that matches a frame rate of a display device, e.g., 910. In some embodiments, the perspective views are selectable by the remote operator. In some embodiments, the remote operator RO can view the images as binocular images with a binocular viewing system, e.g., display goggles.

Stereo Color Image from a Single Color Channel

Current color night vision methods require a degree of complexity, such as separate intensifier tubes for each color or spinning filter discs. A method of reducing complexity and cost would increase acceptance of CNV.

Figure 19:
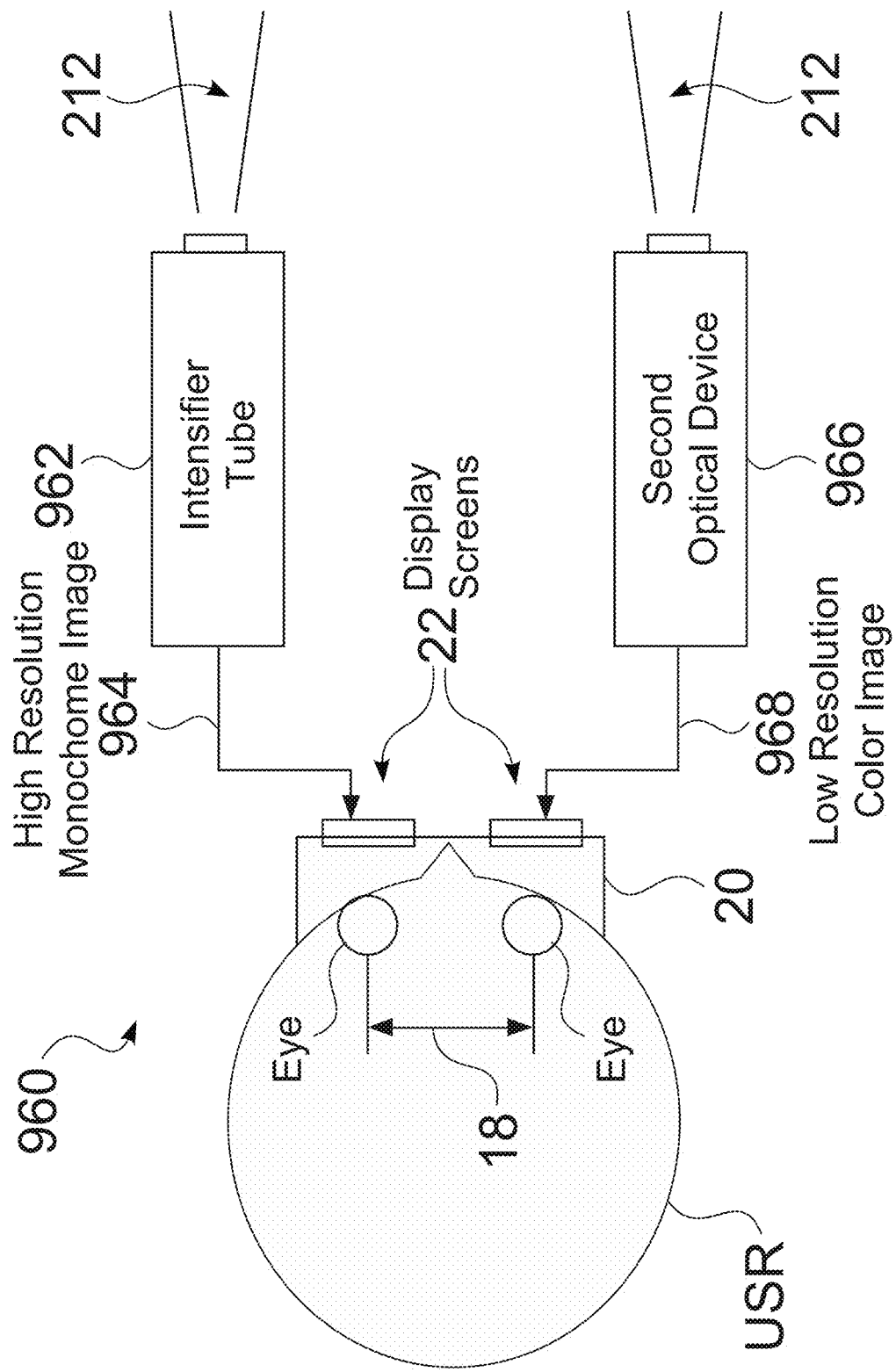
FIG. 19 is a schematic view of an illustrative night vision device that is configured for binocular display of the output of different optical devices.

FIG. 19 is a schematic view of an illustrative night vision device 960 that is configured for binocular display of the output of different optical devices, e.g., 962,966. In an illustrative color night vision device 960, one eye views a high resolution monochrome (white) image 964 from a single intensifier tube 962, while the other eye views a lower resolution color image 968, from a second optical device 966, such as including either a second intensifier, or an LCD display fusing the output from multiple intensifiers. It has been demonstrated that the human brain can combined these inputs 964,968 into a high resolution color image.

Although the monochromatic image 984 seen in FIG. 19 can be alternative colors, a white image works well. In one embodiment, the intensifier 982 is an off-the-shelf white phosphor monocular unit, while the color image is supplied by a Sony a7S 12 Mega Pixel (MP) digital camera, fitted with a zoom lens to match the field of view of the intensifier 982.

An illustrative night vision device 960 comprises a binocular viewing device 20 for viewing by a user, wherein the binocular viewing device 20 includes a first display 22 and a second display 22, a first optical device including an intensifier tube 962 configured to provide a monochrome image 964 to the first display 22, wherein the monochrome image 964 has a first resolution, and a second optical device 966 configured to provide a color image 968 to the second display 22, wherein the color image 968 has a second resolution, wherein the second resolution is lower than the first resolution of the monochrome image 964. In some embodiments, the monochrome image 964 and the color image 968 are configured to be displayed separately and simultaneously to the user through the displays 22, and may be perceived as a combined high resolution color image by the user USR.

Figure 20:
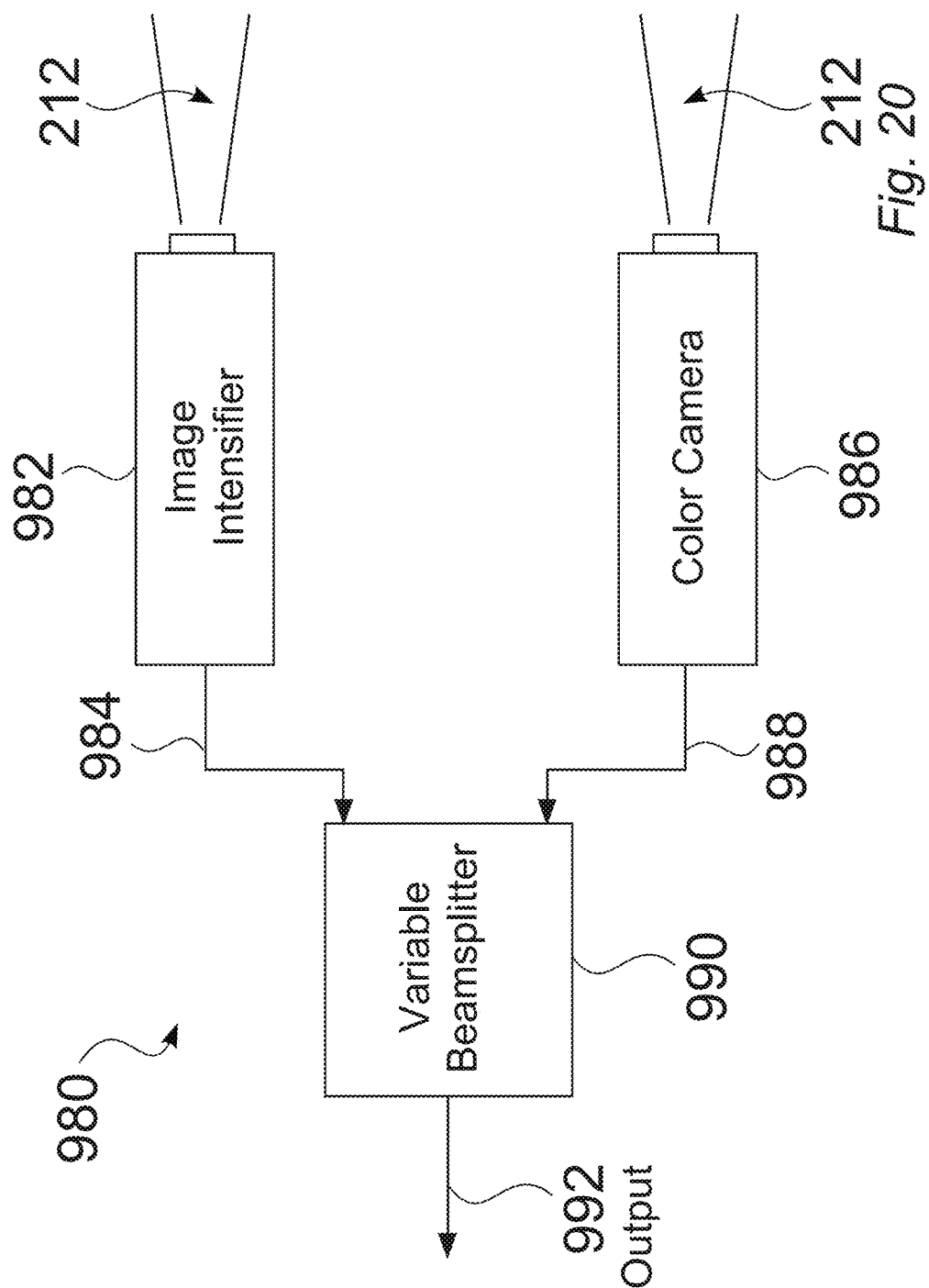
FIG. 20 is a schematic view of an illustrative system for generating a composited image signal from different optical devices, using a variable beamsplitter.

FIG. 20 is a schematic view of an illustrative system 980 for generating a composited image signal 992 from different optical devices 982,986, using a variable beamsplitter. For instance, a highly sensitive color camera 986 can be used to acquire a color image 988 down to a minimum illumination level, while a traditional image intensifier 982 gathers monochromatic imagery 984 at lower illumination levels. Low-light technology has taken a dramatic leap forward recently, such as with the implementation of a 4 million ISO sensor in the Canon ME20E-SH camera. Using large-scale pixels, this sensor is capable of HD video down to 0.0005 lux, or a moonless night. This opens up possibilities in using high-ISO visible light cameras as a partial solution to night vision.

The two sources 982,986 are composited within an optical train using a variable beamsplitter 990, whereby the user can controllably vary the ratio between the two image sources 982,986. At sufficiently high illumination levels, such as a half-moon, the imagery 992 could predominately be derived from the color camera 986, while on overcast nights the intensifier 982 would be favored.

The beamsplitter 990 seen in FIG. 20 may comprise a rotary wheel on which transmission-reflection split varies with the angular position around the wheel. The user can adjust the relative fraction contributed by each source 982, 986, or A/B toggle entirely between one source and the other.

An illustrative device 980 comprises a variable beamsplitter 990, a color camera 986 configured to acquire a color image down to a minimum illumination level, and an image intensifier 982 configured to acquire a monochromatic image at a low illumination level, wherein the variable beamsplitter 990 is configured to receive outputs 988, 984 from the color camera 986 and from the image intensifier 982, wherein the outputs 988,984 of the color camera 986 and the image intensifier 982 are combinable 992 in a ratio that is selectable by a user USR, such as to produce a combined output signal 992, which can be displayed, e.g., through display goggles 20.

3D Focus Techniques for Head-Mounted Night Vision Goggles

Figure 21:
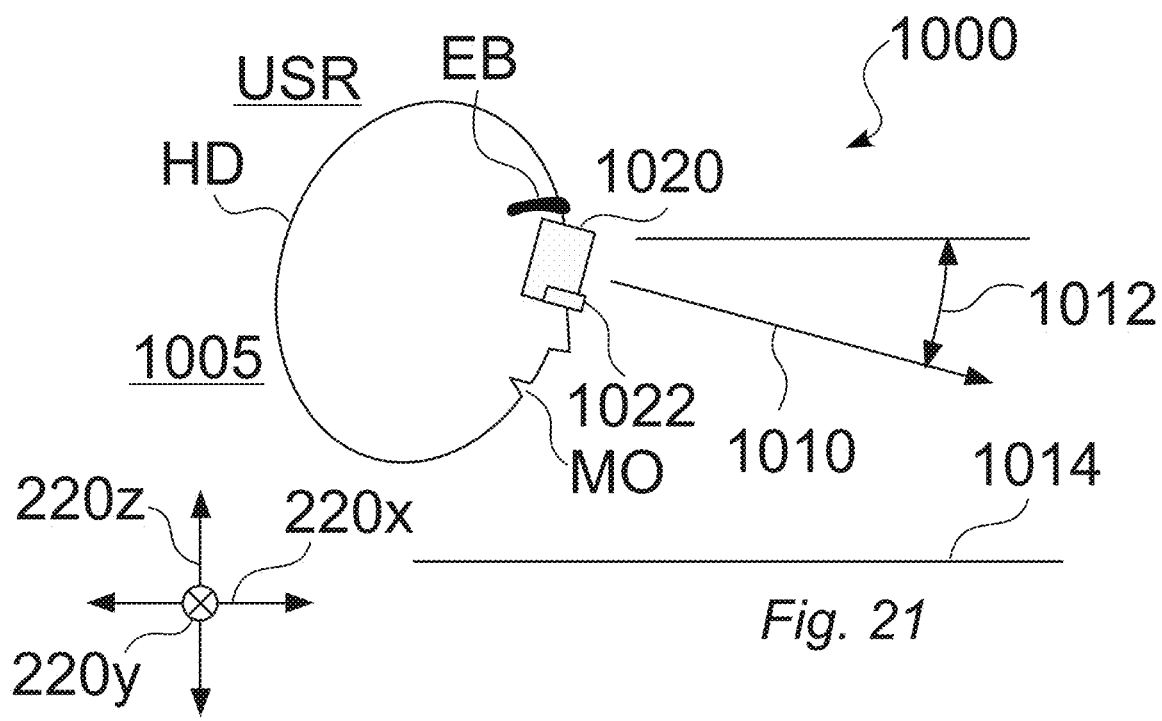
FIG. 21 is a schematic view of an illustrative autofocus system for head-mounted night vision goggles, which is configured to set the focus of the goggles for near vision when the user's head is tilted down.
Figure 22:
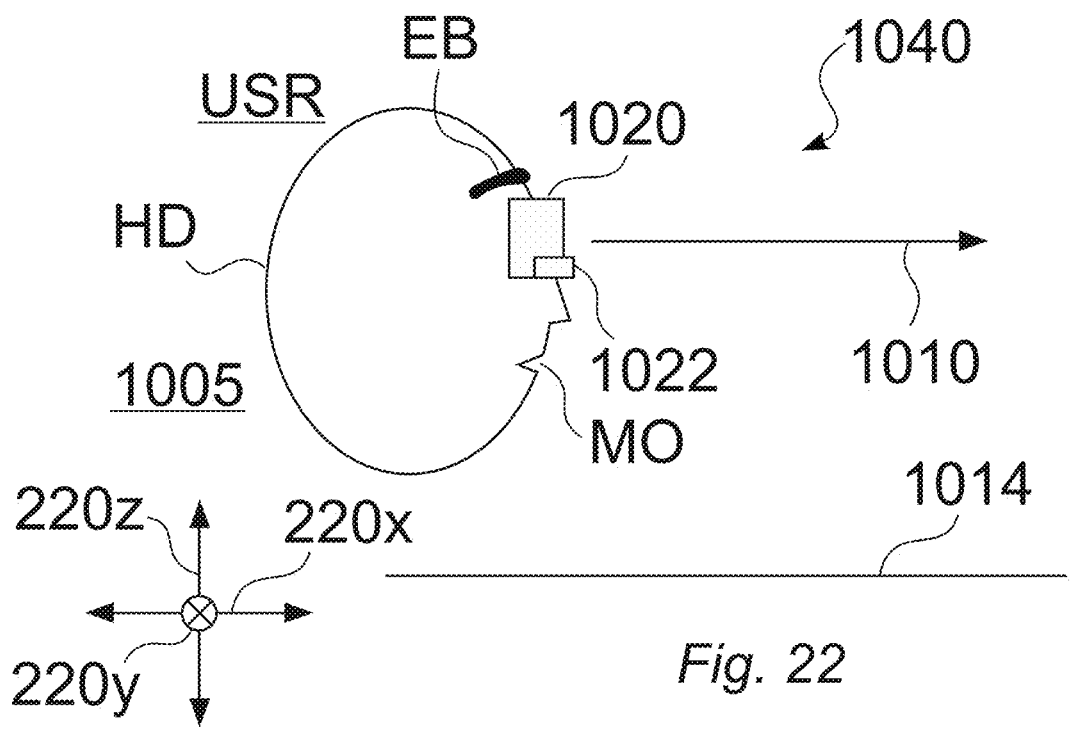
FIG. 22 is a schematic view of an illustrative autofocus system for head-mounted night vision goggles, which is configured to set the focus of the goggles for far vision when the user's head is looking at horizon or vertically upward.

FIG. 21 is a schematic view 1000 of an illustrative autofocus system 1005 for head-mounted night vision goggles 1020, which is configured to set the focus of the goggles 1020 for near vision when the user's head HD is tilted down. FIG. 22 is a schematic view of an illustrative autofocus system for head-mounted night vision goggles, which is configured to set the focus of the goggles 1020 for far vision when the user's head HD is looking at the horizon or vertically upward.

As part of an autofocus system for the 3D or 2D systems disclosed herein, a tilt sensor 1022 can be incorporated into head-mounted night vision goggles 1020. When the user USR tilts his or her head HD down, e.g., with an angle 1012 below horizontal 220s, some system embodiments 1005 assume that the user USR is looking at the ground 1014 or at another nearby object, and correspondingly the focus is set for near. In some embodiments, when the tilt sensor 1022 indicates that the goggles 20 are level 220x or looking upward, the focus is set to a far distance or infinity, on the assumption the user USR is looking up at the sky or at the horizon.

Additionally, in some embodiments, the NVG lenses, e.g., 22 (FIG. 1) can be set to converge in steps, to simulate distance. For instance, three levels of focus can be implemented in an illustrative embodiment: close or map focus; middle or instrument focus; and far focus.

An illustrative autofocus system for a two dimensional (2D) or three dimensional (3D) display system to be worn by a user USR comprises a sensor configured for determining a tilt angle of the display system, and a processor configured to adjust the focus of the display system based on the determined tile angle. In some embodiments, the processor is configured to set the focus of the display device for near vision when the display device is tilted downward. In some embodiments, the is configured to set the focus of the display device for far vision when the display device is tilted at the horizon or vertically upward. In some embodiments, the processor is configured to provide any of a close or map focus, a middle or instrument focus, and a far focus.

An alternate method for adjusting focus of NVGs can be accomplished by a sensor 1022 detecting movement of an eyebrow EB of the user USR, or by the user USR puffing a breath of air with their mouth MO upwards onto a sensor 1022.

Synchronized Pulsed IR Flash to Blind Adversary Night Vision

Figure 23:
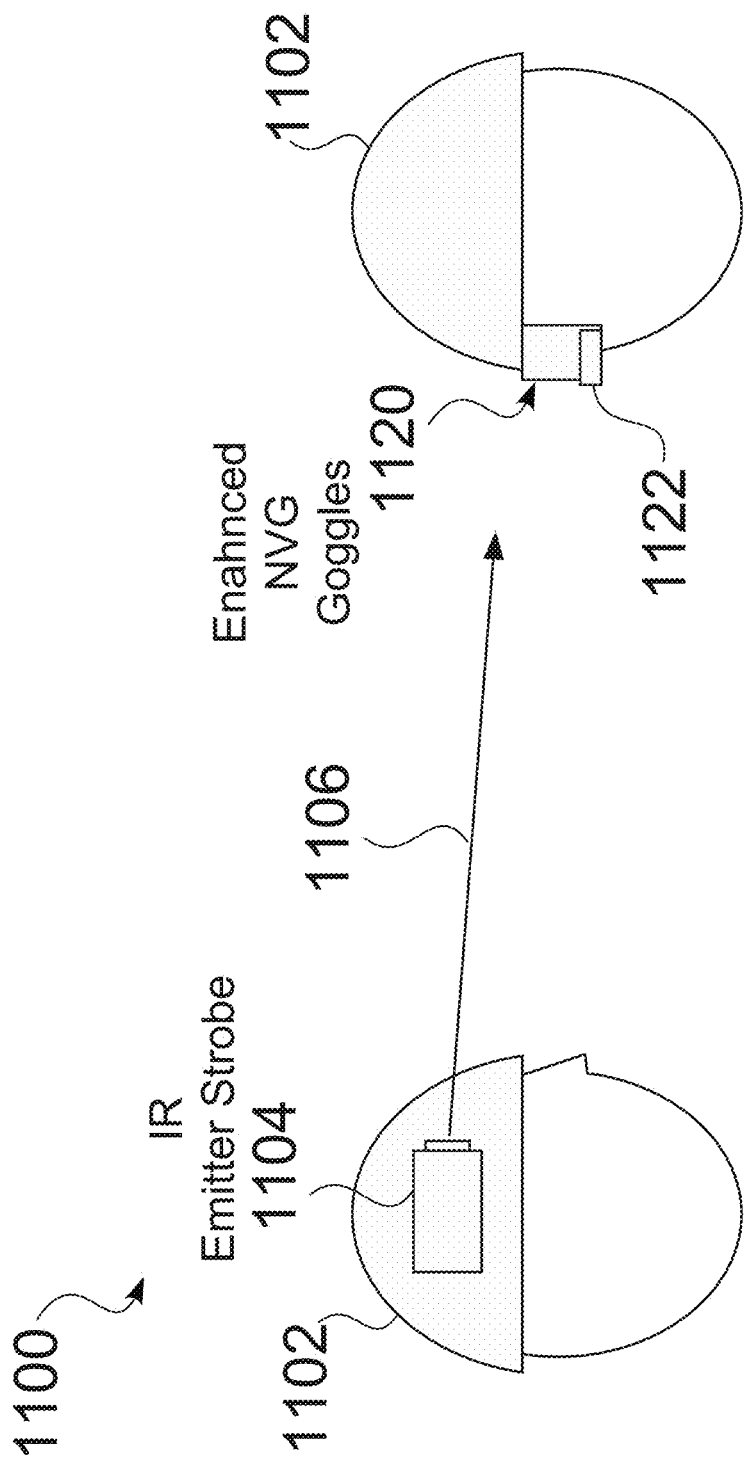
FIG. 23 is a schematic view of illustrative optical devices for offensive and defensive operations.

FIG. 23 is a schematic view 1100 of illustrative optical devices 1104 and 1120 for offensive and defensive operations.

The well-known phenomenon of night vision blinding can be used offensively, that is by causing a bright flash 1106 to disable an enemy's night vision. Intensifiers, e.g., 702 (FIG. 11) have a natural temporal frequency response to external light, based on drive electronics and phosphor physics. As seen in FIG. 23, an intense light 1106 may be pulsed at an adversary or enemy with sufficient frequency such that when their systems start to recover from the pulse, they are hit again with another pulse in time to prevent recovery, keeping the adversary system blind.

As seen in FIG. 23, an offensive embodiment 1104 can be configured to temporarily blind adversaries, using night vision devices (NVDs). The embodiment includes a bright IR emitter strobe light 1104 that in some embodiments can be mounted on a soldier's helmet 1102, or included as part of a "light grenade". In some embodiments, the frequency of the IR light 1106 can be selected to be one that the enemy night vision devices (NVDs) 1120 are particularly susceptible to.

To prevent blinding friendly forces, the NVDs 1120 of friendly forces can be equipped with a number of different features. In one form, a narrow frequency band filter can be used which blocks the IR flash from the strobe, but not other IR frequencies. Alternatively, some embodiments of the NVDs 1120 can be equipped with a gating feature that disables the NVDs 1120 for very short periods of time, on the order of milliseconds. This gating would be specifically timed to coincide with the strobing of the IR light, and would in effect be a notch filter coordinated with the pulsed light source.

An illustrative device for enhanced night vision in an environment that includes a strobed IR light signal comprises night vision goggles 1120 for use by the user USR, and a mechanism 1122 to compensate for the strobed IR light 1106, wherein the mechanism 1122 includes any of a filter that is configured to block the strobed IR light signal 1106, but allow passage of other IR frequencies, or a gating feature that disables the night vision goggles 1120 for short periods of time, wherein the gating is timed to coincide with the arrival of the strobed IR light signal 1106.

FIG. 24 is a high-level block diagram showing an example of a processing device 1200 that can represent any of the systems described above. Any of these systems may include two or more processing devices such as represented in FIG. 22, which may be coupled to each other via a network or multiple networks.

In the illustrated embodiment, the processing system 1200 includes one or more processors 1202, memory 1204, a communication device 1206, and one or more input/output (I/O) devices 1208, all coupled to each other through an interconnect 1210. The interconnect 1210 may be or include one or more conductive traces, buses, point-to-point connections, controllers, adapters and/or other conventional connection devices. The processor(s) 1202 may be or include, for example, one or more general-purpose programmable microprocessors, microcontrollers, application specific integrated circuits (ASICs), programmable gate arrays, or the like, or a combination of such devices. The processor(s) 1002 control the overall operation of the processing device 1200. Memory 1004 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 1204 may store data and instructions that configure the processor(s) 1202 to execute operations in accordance with the techniques described above. The communication device 1206 may be or include, for example, an Ethernet adapter, cable modem, Wi-Fi adapter, cellular transceiver, Bluetooth transceiver, or the like, or a combination thereof. Depending on the specific nature and purpose of the processing device 1200, the I/O devices 1208 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

Some of techniques introduced above can be implemented by using programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium, e.g., a non-transitory computer readable medium. and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media, e.g., read-only memory (ROM); random access memory (RAM); magnetic disk storage media; optical storage media; flash memory devices; etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the examples disclosed herein. Accordingly, the specification and drawings are to be regarded in an illustrative sense rather than a restrictive sense.

What is claimed is:

1. A display system comprising:
   a plurality of imaging devices configured to capture images of a scene;
   an image acquisition and digitization processor configured to receive and digitize the captured images;
   a 3D depth map acquisition processor configured to acquire digital depth maps of fields of view spanned by the plurality of imaging devices;
   an image registration processor configured to register the digitized captured images to the digital depth maps;
   a perspective transformation application processor configured to apply offset perspective transformations to each of the digitized captured images;
   an image overlay processor configured to produce binocular images by overlaying the transformed images; and
   a first display screen and a second display screen oriented with respect to each other and further configured to present the overlaid images.

2. The display device of claim 1, wherein the 3D depth map acquisition processor is coupled to a time-of-flight (ToF) camera that is configured to capture the depth maps of the field of views acquired by the 3D depth map acquisition processor.

3. The display device of claim 1, wherein the 3D depth map acquisition processor is coupled to an infrared depth sensor that is configured to capture the depth maps of the field of views acquired by the 3D depth map acquisition processor.

4. The display device of claim 1, wherein the 3D depth map acquisition processor is coupled to a passive imager that is configured to capture the depth maps of the field of views acquired by the 3D depth map acquisition processor.

5. The display device of claim 4, wherein the passive imager is a plenoptic camera.

6. The display device of claim 5, wherein the plenoptic camera further comprises an array of micro-lenses and each individual micro-lens having a complementary color filter assigned thereto.

7. The display device of claim 5, wherein the plenoptic camera further comprises an array of non-filtering micro-lenses.

8. The display device of claim 1, wherein at least one of the plurality of imaging devices comprises an array of interleaved micro-lenses configured with a first portion and a second portion, the first portion further configured to capture color imagery and the second portion configured to capture depth map information.

9. The display device of claim 8, wherein the 3D depth map acquisition processor is coupled to the at least one imaging devices comprising the array of interleaved micro-lenses.

10. The display device of claim 1, further comprising one or more infrared band filters, one or more complementary color filters, or one or more multispectral filters.

11. A processor implemented method, comprising the steps of:
    acquiring, via a plurality of imaging devices, a first image and a second image of an imaged area;
    acquiring, via a plurality of depth map imagers, three-dimensional (3D) depth maps of the imaged area;
    registering, via the processor, the acquired first and second images to corresponding acquired depth maps;
    transforming, via the processor, the acquired images by shifting each pixel within the images by an amount indicated by the corresponding registered depth map and an offset distance between an acquiring imaging device and an eye of a user;
    overlaying, via the processor, the transformed images so as to produce binocular images; and
    presenting the binocular images via one or more display screens.

12. The method of claim 11, wherein the depth maps of the image area are acquired via any of: a plenoptic camera, an infrared depth sensor, or a time-of-flight (ToF) camera.

13. The method of claim 12, further comprising the step of:
    filtering any of: the first image, the second image, and the depth maps.

14. The method of claim 13, wherein the filtering includes filtering through any of: cyan, magenta, yellow, infrared, and multispectral filters.

15. A non-transitory computer readable medium having stored thereon a computer program having machine readable instructions for performing, when executed by one or more processors, steps comprising:
    triggering a plurality of imaging devices to capture a first image and a second image of an imaged area;
    triggering a plurality of depth map imagers to capture three-dimensional (3D) depth maps of the imaged area;
    registering the acquired first and second images to corresponding acquired depth maps;
    transforming the acquired images by shifting each pixel within the images by an amount indicated by the corresponding registered depth map and an offset distance between an acquiring imaging device and an eye of a user;
    overlaying the transformed images so as to produce binocular images; and
    presenting the binocular images via one or more display screens.

* * * * *